United States Patent
Lu et al.

(10) Patent No.: US 12,001,777 B2
(45) Date of Patent: Jun. 4, 2024

(54) FONT SWITCHING METHOD AND ELECTRONIC DEVICE

(71) Applicant: Petal Cloud Technology Co., Ltd., Dongguan (CN)

(72) Inventors: Liang Lu, Dongguan (CN); Yaoming Liu, Beijing (CN); Lin Peng, Dongguan (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/002,411

(22) PCT Filed: Mar. 31, 2021

(86) PCT No.: PCT/CN2021/084664
§ 371 (c)(1),
(2) Date: Dec. 19, 2022

(87) PCT Pub. No.: WO2021/253922
PCT Pub. Date: Dec. 23, 2021

(65) Prior Publication Data
US 2023/0325581 A1 Oct. 12, 2023

(30) Foreign Application Priority Data
Jun. 19, 2020 (CN) .......................... 202010570465.6

(51) Int. Cl.
*G06F 40/109* (2020.01)
*G06F 3/0482* (2013.01)
(Continued)

(52) U.S. Cl.
CPC .......... *G06F 40/109* (2020.01); *G06F 3/0482* (2013.01); *G06V 30/245* (2022.01); *G06F 9/451* (2018.02)

(58) Field of Classification Search
CPC ...... G06F 40/109; G06F 3/0482; G06F 9/451; G06V 30/245
See application file for complete search history.

(56) References Cited

U.S. PATENT DOCUMENTS 5,689,724 A * 11/1997 Morgan .................. G06F 9/451
715/205
6,337,924 B1 * 1/2002 Smith .................. G06V 30/245
382/175
(Continued)

FOREIGN PATENT DOCUMENTS

| CN | 101419715 A | 4/2009 |
| CN | 104111822 A | 10/2014 |

(Continued)

OTHER PUBLICATIONS

Debnath et al., On Android, how do I get the font type selected on device and also know if it's the default one?, https://stackoverflow.com/questions/57920278/on-android-how-do-i-get-the-font-type-selected-on-device-and-also-know-if-its, stackoverflow.com, Sep. 16, 2019 (Year: 2019).*

*Primary Examiner* — Nicholas Ulrich
(74) *Attorney, Agent, or Firm* — Conley Rose, P.C.

(57) ABSTRACT

A font switching method obtains, through pixel matching with a comparison font, a target font consistent with a font currently used by an operating system, and applies the target font to a third-party application, enabling the third-party application to accurately vary with a font change of the operating system and to avoid inconsistency between the font used by the third-party application and the font used by the operating system.

20 Claims, 16 Drawing Sheets

(51) Int. Cl.
     *G06F 9/451*          (2018.01)
     *G06V 30/244*     (2022.01)

(56) References Cited

U.S. PATENT DOCUMENTS

| | | | |
|---|---|---|---|
| 9,002,877 B2 * | 4/2015 | Fu | G06T 11/203 |
| | | | 707/769 |
| 2011/0090229 A1 | 4/2011 | Bacus et al. | |
| 2014/0317497 A1 * | 10/2014 | Liu | G06F 40/109 |
| | | | 715/269 |
| 2016/0246764 A1 | 8/2016 | Huang et al. | |
| 2018/0365536 A1 * | 12/2018 | Wang | G06N 3/045 |

FOREIGN PATENT DOCUMENTS

| | | |
|---|---|---|
| CN | 106528144 A | 3/2017 |
| CN | 111273982 A | 6/2020 |

* cited by examiner

TO

CONT. FROM FIG. 5A

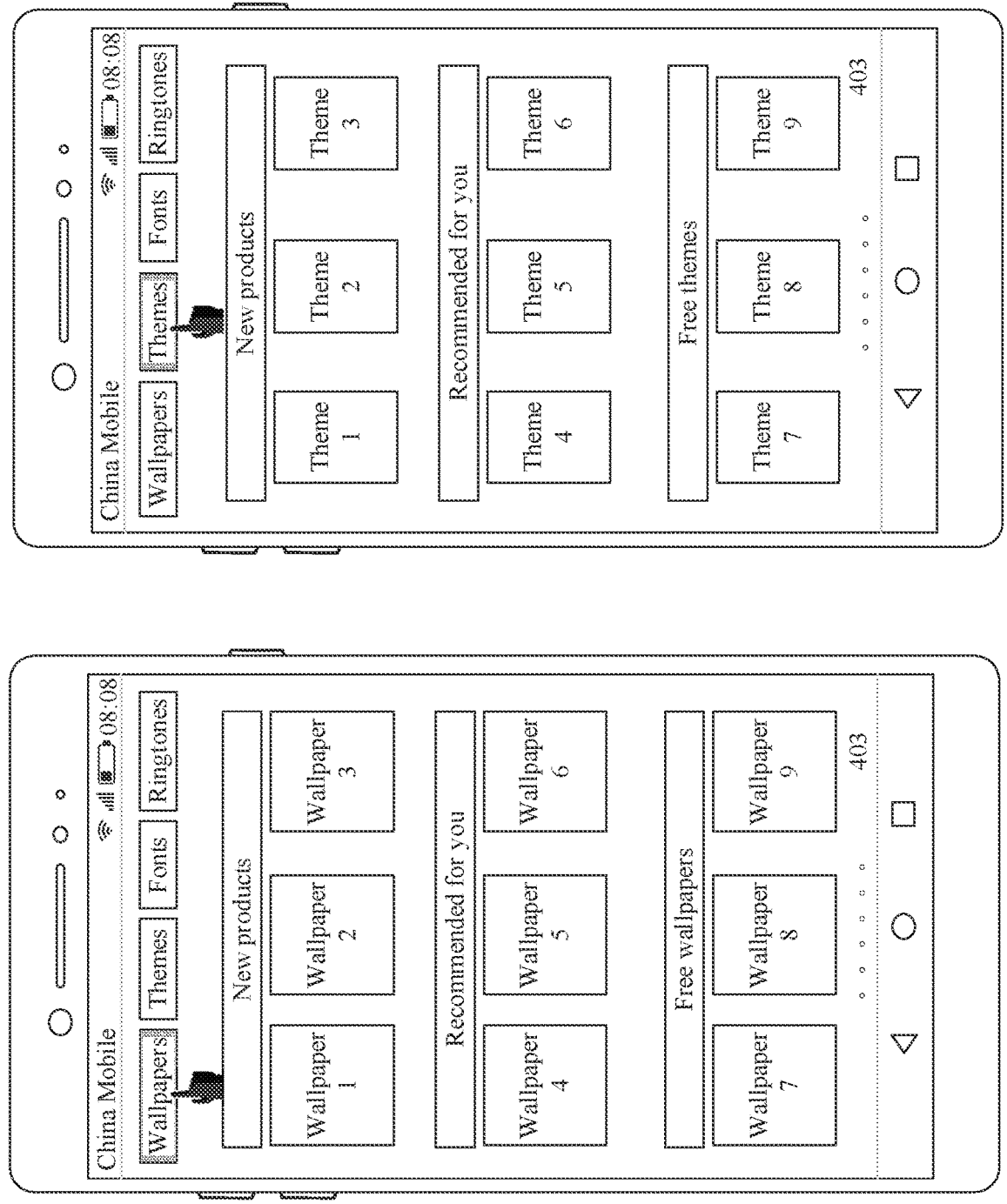

CONT.
FROM

CONT. FROM FIG. 7(a)
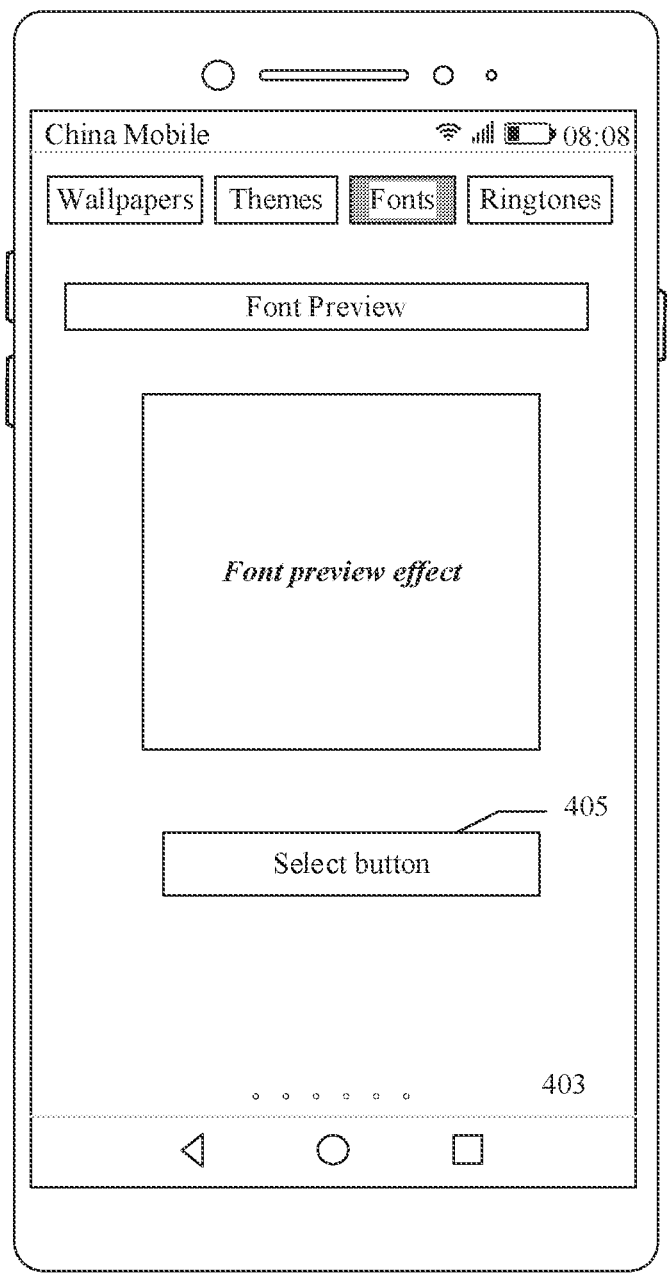
FIG. 7(b)
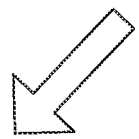
TO FIG. 7(c)

FONT SWITCHING METHOD AND ELECTRONIC DEVICE

CROSS-REFERENCE TO RELATED APPLICATIONS

This is a U.S. National Stage of International Patent Application No. PCT/CN2021/084664 filed on Mar. 31, 2021, which claims priority to Chinese Patent Application No. 202010570465.6 filed on Jun. 19, 2020. Both of the aforementioned applications are hereby incorporated by reference in their entireties.

TECHNICAL FIELD

This application relates to the field of communication technologies, and in particular, to a font switching method and an electronic device.

BACKGROUND

With rapid development of electronic technologies, an electronic device (for example, a mobile phone or a tablet computer) usually has various theme packages, and provides a user with various themes for selection in a Themes store, to enrich display images of the electronic device. In particular, there are various custom fonts in the themes. The user may select a custom font preferred by the user from the foregoing custom fonts, and set the preferred custom font to an operating system theme font. To be specific, the user imports the custom font into an operating system of the electronic device, so that a font on a display interface of a desktop of the electronic device is displayed as the custom font. However, third-party application software installed in the electronic device cannot determine a storage path of a custom font currently used by the operating system. Therefore, after the operating system switches the font, the font used by, the third-party application software cannot accurately vary with a change of the font used by the operating system. This causes the font used by the third-party application software to be inconsistent with the font used by the operating system. The third-party application software is an application or software that is not built in an operating system, and application functions of a mobile phone may be extended by installing a program developed by a third party. The third-party application software includes but is not limited to instant messaging software, game software, browser software, and the like.

SUMMARY

This application provides a font switching method and an electronic device, to resolve a problem in the conventional technology that a font used by third-party application software is inconsistent with a font used by an operating system.

To achieve the foregoing objective, this application uses the following technical solutions.

According to a first aspect, an embodiment of this application provides a font switching method. The method may include: generating a target dot matrix based on a font currently used by an operating system; obtaining comparison dot matrices corresponding to various types of fonts loaded by the operating system; performing pixel matching on each comparison dot matrix and the target dot matrix, to determine a comparison dot matrix matching the target dot matrix, and using a font of a type corresponding to the matched comparison dot matrix as a target font; and switching a font of a third-party application to the target font. Various types of fonts loaded by the operating system may include all different types of fonts loaded by the operating system, for example, Song typeface, regular script, and Gothic typeface, or may be a non-default font of the operating system loaded by the operating system. A font can be described by using a Typeface class. Each type of font has detailed description information corresponding to the type of font. FontID, GlyphID, and a style (style) attribute of the font are defined in the Typeface class. The style attribute can be normal, bold, italic, or bold italic. FontID is an identifier of Font and is globally unique. For example, FontID of bold Song typeface is different from FontID of normal Song typeface, and FontID of Song typeface is also different from FontID of regular script. Font is a font with a style, and may be considered as a subset of the font. For example, when the font is Song typeface, Font may be normal Song typeface, bold Song typeface, italic Song typeface, or bold italic Song typeface. GlyphID is an identifier of a font style of a character in a corresponding font. Glyph of a character can be obtained by using GlyphID. Glyph is a glyph of a font. Each character has its own glyph under a corresponding font. When a display character is rendered, a glyph of the character and other display attributes (for example, a font size, italic typeface, Gothic typeface, italic Gothic typeface, and a color) need to be used for rendering and displaying.

The target dot matrix is a dot matrix that can reflect a font feature of a font currently used by the operating system, and may be specifically a dot matrix generated by drawing a segment of text by using the font currently used by the operating system, for example, a bitmap (bitmap) or a pixel map. The foregoing comparison dot matrix is also a dot matrix that can reflect font features of the various types of fonts loaded by the operating system, and may be specifically a dot matrix generated by drawing a segment of text by using the various types of fonts loaded by the operating system. The dot matrix is an image including n pixels, and a display, effect of the dot matrix is implemented by an arrangement of a pixel array. When an operation is performed on the dot matrix, specifically, on each pixel in the dot matrix, that is, an object of the operation is each pixel. Attributes such as hue, saturation, and transparency of the pixel may be changed, to change the display effect of the dot matrix. Different arrangements and coloring may be performed on the pixel to form different images. It should be noted that, when a preset character is drawn on the comparison dot matrix, the preset character whose font size and character content are the same as those during drawing of the target dot matrix needs to be drawn. Because generated bitmaps are generated in a same font size, bitmap sizes of the obtained character are also the same. In this way, normalization processing can be effectively avoided, and precision during pixel comparison can be improved.

According to the font switching method provided in this embodiment of this application, a target font consistent with a font currently used by an operating system is found through pixel matching of a dot matrix, and then the target font is applied to a third-party application, so that the third-party application can accurately vary with a font change of the operating system. This avoids a problem that the font used by the third-party application software is inconsistent with the font used by the operating system.

In this embodiment of this application, the font currently used by the operating system may be a custom font selected by the user. The user may select, in an application such as Themes store, a custom theme or a custom font preferred by the user, and the operating system sets a font in the custom theme selected by, the user or the custom font selected by the user to a font currently used by the operating system.

In a possible implementation of the first aspect, before the target dot matrix is generated based on the font currently used by the operating system, whether the third-party application is started may be further detected in real time. A step of generating the target dot matrix is performed when it is detected that the third-party application is started.

A monitoring program (for example, a hook program) may be set in a process management service to detect whether the third-party application is started. Whether the third-party application is started is detected in real time, and when the third-party application is started, a font switching operation is performed in time, so that it can be ensured that when the user uses the third-party application, inconsistency of fonts used by the program does not occur. In addition, the monitoring program may be set to detect whether the third-party application is started, so that font switching can be automatically implemented, to improve switching efficiency.

In a possible implementation of the first aspect, the generating a target dot matrix based on a font currently used by an operating system may include: creating a bitmap object and a canvas object; drawing a preset character in the canvas object based on the font currently used by the operating system, and saving a drawn result in the bitmap object, to obtain the target dot matrix. The foregoing character content may be set to "This is a test text", and the font size may be set to 48px. It may be understood that the character content and the font size may be set based on a requirement. Details are not described herein again. It may be further understood that a size of the bitmap affects a matching effect. A larger size of the bitmap indicates higher matching precision and higher accuracy, but causes a decrease in glyph comparison efficiency. Therefore, a larger font size is not always preferred. To achieve better comparison precision and comparison efficiency, it is found through tests that a font size of 48px may be selected, and in this case, a bitmap size of 64*64 is obtained.

The bitmap object and the canvas object that are used to generate the target dot matrix are created by using an original API of the operating system, and then pixel comparison is performed based on the bitmap object. This can effectively ensure accuracy of a comparison result; and can be implemented by invoking only the original API of the operating system. Therefore, good system compatibility is provided.

In a possible implementation of the first aspect, the obtaining comparison dot matrices corresponding to various types of fonts loaded by the operating system includes: obtaining all types of fonts loaded by the operating system; generating comparison dot matrices corresponding to all types of fonts loaded by the operating system; and obtaining comparison dot matrices corresponding to the various types of fonts loaded by the operating system.

To ensure that the target font currently used by the operating system can be accurately identified, all types of fonts loaded by the operating system are obtained, and then respective corresponding comparison dot matrices are generated. In this way, pixel comparison can be performed on the comparison dot matrix and the target dot matrix to find the target font currently used by the operating system.

Specifically, the generating comparison dot matrices corresponding to all types of fonts loaded by the operating system includes: creating canvas objects and bitmap objects corresponding to all types of fonts loaded by the operating system; and drawing preset characters in the canvas objects based on all types of fonts loaded by the operating system, and saving drawn results in the bitmap objects corresponding to the various types of fonts.

The bitmap object and the canvas object that are used to generate the comparison dot matrix are created by using the original API of the operating system, and then pixel comparison is performed based on the bitmap object of the target dot matrix and the bitmap object of the comparison dot matrix. This can effectively ensure accuracy of a comparison result, and can be implemented by invoking only the original API of the operating system. Therefore, good system compatibility is provided.

In a possible implementation of the first aspect, the obtaining comparison dot matrices corresponding to various types of fonts loaded by the operating system includes: obtaining all types of fonts loaded by the operating system and a default font of the operating system; determining a non-default font of the operating system based on all types of fonts loaded by the operating system and the default font of the operating system; generating a comparison dot matrix corresponding to the non-default font of the operating system; and obtaining the comparison dot matrix corresponding to the non-default font of the operating system.

A custom font selected by the user by using an application such as Themes store is usually not included in the default font of the operating system. Therefore, the non-default font of the operating system loaded by the operating system of the electronic device may be obtained. This can effectively reduce a quantity of comparison dot matrices, improve processing efficiency, and reduce occupation of system resources.

Specifically, the generating a comparison dot matrix corresponding to the non-default font of the operating system includes: creating a canvas object and a bitmap object corresponding to each non-default font of the operating system; drawing a preset character in the canvas object based on each non-default font of the operating system; and saving a drawn result in the bitmap object corresponding to each non-default font of the operating system.

The bitmap object and the canvas object that are used to generate the comparison dot matrix are created by using the original API of the operating system, and then pixel comparison is performed based on the bitmap object of the target dot matrix and the bitmap object of the comparison dot matrix. This can effectively ensure accuracy of a comparison result, and can be implemented by invoking only the original API of the operating system. Therefore, good system compatibility is provided.

In a possible implementation of the first aspect, the performing pixel matching on each comparison dot matrix and the target dot matrix, to determine a comparison dot matrix matching the target dot matrix, and using a font of a type corresponding to the matched comparison dot matrix as a target font includes:

performing pixel comparison on each obtained comparison dot matrix and the target dot matrix, and when a comparison dot matrix whose pixel distribution is consistent with that of the target dot matrix is matched, using the comparison dot matrix whose pixel distribution is consistent with that of the target dot matrix as the comparison dot matrix matching the target dot matrix, and determining a font corresponding to the comparison dot matrix as the target font. The comparison dot matrix matching the target dot matrix is determined based on whether pixel distribution is consistent, so that the target font can be accurately determined.

In a possible implementation of the first aspect, both the target dot matrix and the comparison dot matrix are monochromatic bitmaps, and correspondingly, the performing pixel matching on each comparison dot matrix and the target dot matrix, to determine a comparison dot matrix matching the target dot matrix, and using a font of a type corresponding to the matched comparison dot matrix as a target-font includes:

separately obtaining binary data of the target dot matrix and binary data of each comparison dot matrix; and determining, as the comparison dot matrix matching the target dot matrix, a comparison dot matrix corresponding to the binary data of the comparison dot matrix that matches the binary data of the target dot matrix, and using the font of the type corresponding to the matched comparison dot matrix as the target font. Comparison by using binary data can effectively improve comparison efficiency.

In a possible implementation of the first aspect, the switching a font of a third-party application to the target font includes:

setting a storage path of a font file of the target font for the third-party application;

controlling the third-party application to obtain and load the font file of the target font based on the storage path of the font file of the target font; and rendering a display interface of the third-party application based on the loaded font file of the target font, so that a character used on the display interface of the third-party application is a character corresponding to the font file of the target font.

According to a second aspect, an embodiment of this application provides an electronic device. The electronic device may include a generation unit, an obtaining unit, a matching unit, and a switching unit.

The generation unit is configured to generate a target dot matrix based on a font currently used by an operating system.

The obtaining unit is configured to obtain comparison dot matrices corresponding to various types of fonts loaded by the operating system.

The matching unit is configured to: perform pixel matching on each comparison dot matrix and the target dot matrix, to determine a comparison dot matrix most matching the target dot matrix, and use a font of a type corresponding to the most matched comparison dot matrix as a target font.

The switching unit is configured to switch a font of a third-party application to the target font.

According to the electronic device provided in this embodiment of this application, a target font consistent with a font currently used by an operating system may also be found through pixel matching of a template, and then the target font is applied to a third-party application, so that the third-party application can accurately vary with a font change of the operating system. This avoids a problem that the font used by the third-party application software is inconsistent with the font used by the operating system.

In a possible implementation of the second aspect, the electronic device may further include a monitoring unit.

The monitoring unit is configured to: before the target dot matrix is generated based on the font currently used by the operating system, detect in real time whether the third-party application is started.

When the monitoring unit detects that the third-party application is started, a first generation unit performs a step of generating the target dot matrix.

Whether the third-party application is started is detected in real time, and when the third-party application is started, a font switching operation is performed in time, so that it can be ensured that when the user uses the third-party application, inconsistency of fonts used by the program does not occur. In addition, the monitoring program may be set to detect whether the third-party application is started, so that font switching can be automatically implemented, to improve switching efficiency.

In a possible implementation of the second aspect, the generation unit may include a first creating unit and a first drawing unit.

The first creating unit is configured to create a bitmap object and a canvas object.

The first drawing unit is configured to: draw a preset character in the canvas object based on the font currently used by the operating system, and save a drawn result in the bitmap object, to obtain the target dot matrix.

The bitmap object and the canvas object that are used to generate the target dot matrix are created by using an original API of the operating system, and then pixel comparison is performed based on the bitmap object. This can effectively ensure accuracy of a comparison result, and can be implemented by invoking only the original API of the operating system. Therefore, good system compatibility is provided.

In a possible implementation of the second aspect, the obtaining unit is mainly, configured to: obtain the various types of fonts loaded by the operating system, generate comparison dot matrices corresponding to the various types of fonts loaded by the operating system, and obtain the comparison dot matrices corresponding to the various types of fonts loaded by the operating system.

To accurately identify the target font currently used by the operating system, the various types of fonts loaded by the operating system are obtained, and then respective corresponding comparison dot matrices are generated. In this way, pixel comparison can be performed on the comparison dot matrix and the target dot matrix to find the target font currently used by the operating system.

Specifically, the obtaining unit may include a second creating unit and a second drawing unit.

The second creating unit is configured to create canvas objects and bitmap objects corresponding to the various types of fonts loaded by the operating system.

The second drawing unit is configured to: draw preset characters in the canvas objects based on the various types of fonts loaded by the operating system, and save drawn results in the bitmap objects corresponding to the various types of fonts.

The bitmap object and the canvas object that are used to generate the comparison dot matrix are created by using the original API of the operating system, and then pixel comparison is performed based on the bitmap object of the target dot matrix and the bitmap object of the comparison dot matrix. This can effectively ensure accuracy of a comparison result, and can be implemented by invoking only the original API of the operating system. Therefore, good system compatibility is provided.

In a possible implementation of the second aspect, the obtaining unit is mainly configured to: obtain the various types of fonts loaded by the operating system and a default font of the operating system, determine a non-default font of the operating system based on the various types of fonts loaded by the operating system and the default font of the operating system, generate a comparison dot matrix corresponding to the non-default font of the operating system, and obtain the comparison dot matrix corresponding to the non-default font of the operating system.

A custom font selected by the user by using an application such as Themes store is usually not included in the default font of the operating system. Therefore, the foregoing various types of fonts may alternatively be the non-default font of the operating system loaded by the operating system of the electronic device. This can effectively reduce a quantity of comparison dot matrices, improve processing efficiency, and reduce occupation of system resources.

Specifically, the obtaining unit may include a third creating unit and a third drawing unit.

The third creating unit is configured to create a canvas object and a bitmap object corresponding to each non-default font of the operating system.

The third drawing unit is configured to: draw a preset character in the canvas object based on each non-default font of the operating system, and save a drawn result in the bitmap object corresponding to each non-default font of the operating system.

The bitmap object and the canvas object that are used to generate the comparison dot matrix are created by using the original API of the operating system, and then pixel comparison is performed based on the bitmap object of the target dot matrix and the bitmap object of the comparison dot matrix. This can effectively ensure accuracy of a comparison result, and can be implemented by invoking only the original API of the operating system. Therefore, good system compatibility is provided.

In a possible implementation of the second aspect, the matching unit 130 is mainly configured to: perform pixel comparison on each obtained comparison dot matrix and the target dot matrix, and when a comparison dot matrix whose pixel distribution is consistent with that of the target dot matrix is matched, use the comparison dot matrix whose pixel distribution is consistent with that of the target dot matrix as the comparison dot matrix matching the target dot matrix, and determine a font corresponding to the comparison dot matrix as the target font.

In a possible implementation of the second aspect, both the target dot matrix and the comparison dot matrix are monochromatic bitmaps, and correspondingly, the matching unit is mainly configured to: separately obtain binary data of the target dot matrix and binary data of each comparison dot matrix, determine, as the comparison dot matrix matching the target dot matrix, a comparison dot matrix corresponding to the binary data of the comparison dot matrix that matches the binary data of the target dot matrix, and use the font of the type corresponding to the matched comparison dot matrix as the target font.

In a possible implementation of the second aspect, the switching unit is mainly configured to: set a storage path of a font file of the target font for the third-party application, control the third-party application to obtain and load the font file of the target font based on the storage path of the font file of the target font, and render a display interface of the third-party application based on the loaded font file of the target font, so that a character used on the display interface of the third-party application is a character corresponding to the font file of the target font.

According to a third aspect, an embodiment of this application provides an electronic device. The electronic device includes a memory and a processor. The memory is configured to store a computer program, and the processor is configured to perform the method according to the first aspect when invoking the computer program.

According to a fourth aspect, an embodiment of this application provides a computer-readable storage medium. The computer-readable storage medium stores a computer program, and when the computer program is executed by a processor, the method according to the first aspect is implemented.

According to a fifth aspect, an embodiment of this application provides a computer program product. When the computer program product runs on an electronic device, the electronic device is enabled to perform the method according to the first aspect.

According to a sixth aspect, an embodiment of this application provides a chip system. The chip system includes a memory and a processor. The processor executes a computer program stored in the memory, to implement the method according to the first aspect. The chip system may be a single chip or a chip module including a plurality of chips.

For beneficial effects of the second aspect to the sixth aspect, refer to the related descriptions in the first aspect. Details are not described herein again.

DESCRIPTION OF EMBODIMENTS

Figure 1:
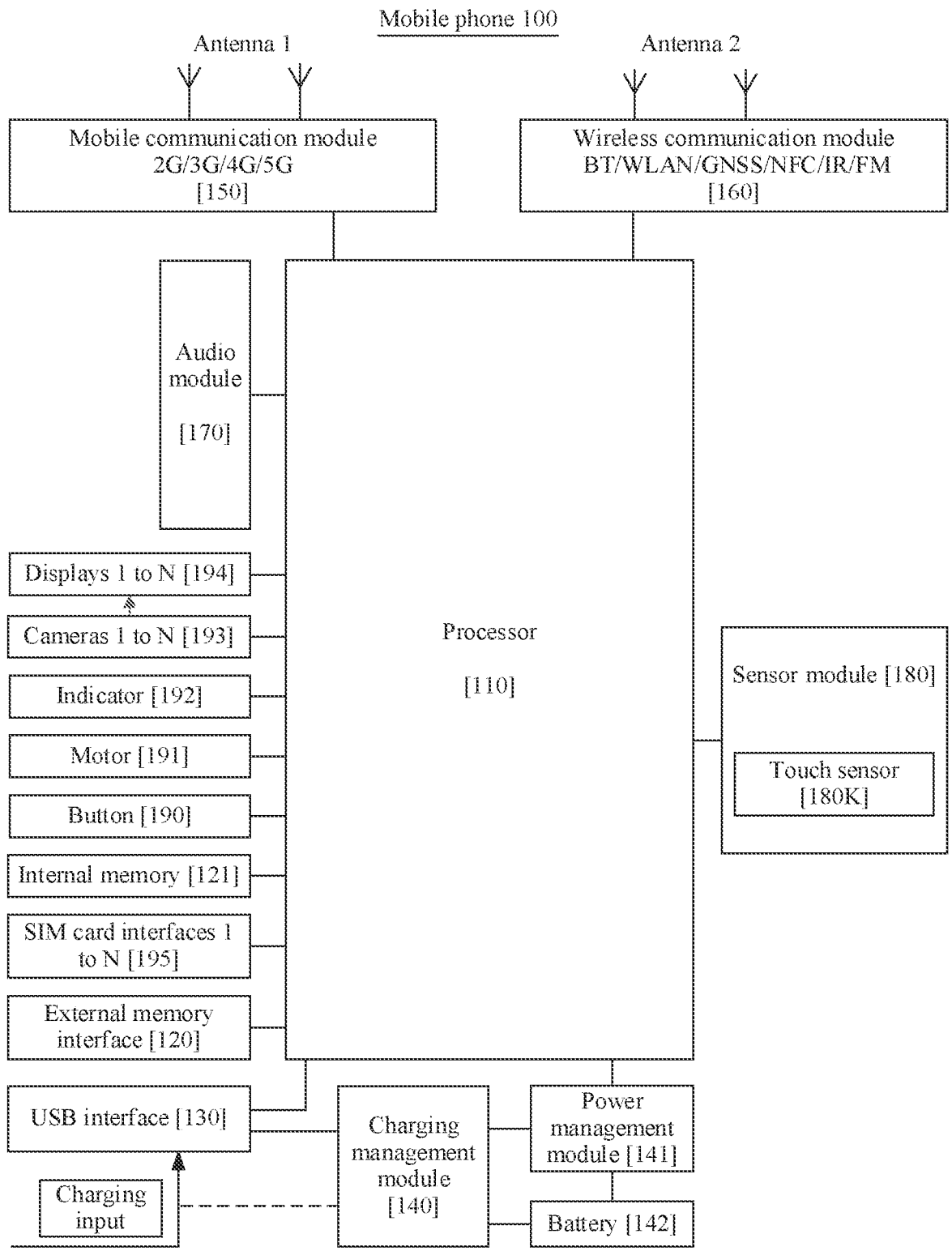
FIG. 1 is a diagram of a partial structure of a mobile phone according to an embodiment of this application.

In the following descriptions, for illustration instead of limitation, specific details such as a particular operating system structure and a technology are provided to make a thorough understanding of embodiments of this application. However, a person skilled in the art should know that this application may also be implemented in other embodiments without these specific details. In other cases, detailed descriptions of well-known operating systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the descriptions of the specification and appended claims of this application, the terms "first", "second", "third", and the like are merely intended for distinction and description, but shall not be understood as an indication or an implication of relative importance.

Reference to "an embodiment", "some embodiments", or the like described in the specification of this application indicates that one or more embodiments of this application include a specific feature, structure, or characteristic described with reference to embodiments. Therefore, statements such as "in one embodiment", "in some embodiments", "in some other embodiments", and "in still some other embodiments" that appear at different places in this specification do not necessarily refer to a same embodiment, but mean "one or more but not all embodiments", unless otherwise specially emphasized in another manner. The terms "include", "contain", "have", and their variants all mean "include but are not limited to", unless otherwise specifically emphasized in another manner.

In this embodiment of this application, to resolve an existing problem that a font used by third-party application software cannot accurately vary with a change of a font used by an operating system of an electronic device, and consequently, the font used by the third-party application software is inconsistent with the font used by the operating system, a target dot matrix is created based on the font currently used by the operating system, all fonts used by the electronic device are found, corresponding comparison dot matrices are created based on these fonts, and a target font matching the target dot matrix is further found from the comparison dot matrices. In this way, the target font can be accurately set for the third-party application, so that the font used by the third-party application can be consistent with the font used by the operating system of the electronic device. This prevents the font used by the third-party application software from being inconsistent with the font used by the operating system.

The font switching method provided in this embodiment of this application may be applied to an electronic device such as a mobile phone, a tablet computer, a wearable device, a vehicle-mounted device, and an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), and a specific type of the electronic device is not limited in this embodiment of this application.

For example, the electronic device may be a station (STATION, ST) in a WLAN, and may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or another processing device connected to a wireless modem, a vehicle-mounted device, an terminal in an Internet of Vehicles, a computer, a laptop computer, a handheld communication device, a handheld computing device, a satellite wireless device, a wireless modem card, a television set-top box (set top box, STB), customer premise equipment (customer premise equipment, CPE) and/or another device for communicating over a wireless system, and a terminal in a next-generation communication system, for example, a mobile terminal in a 5G network, or a mobile terminal in a future evolved public land mobile network (Public Land Mobile Network, PLMN).

By way of example, and not limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-size devices that can implement complete or partial functions without depending on smartphones, such as smart watches or smart glasses, and devices that are dedicated to only one type of application function and need to work with other devices such as smartphones, such as various smart bands or smart jewelry for monitoring physical signs.

For example, the electronic device is a mobile phone. FIG. 1 is a schematic block diagram of a partial structure of a mobile phone 100 related to this embodiment.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a sensor module 180, a button, a motor, an indicator, a subscriber identification module (subscriber identification module, SIM) card interface, and the like.

It may be understood that the structure shown in this embodiment of this application does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves operating system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver transmitter (universal asynchronous receiver/transmitter, UART) interface, a mobile industry processor interface (mobile industry processor interface, MIPI), a general-purpose input/output (general-purpose input/output. GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to a touch sensor 180K, a charger, a flash, the camera, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The MIPI interface may be configured to connect the processor 110 to a peripheral component such as a display 194 or the camera. The interface includes a display serial interface (display serial interface, DSI) and the like. In some embodiments, the processor 110 communicates with the display 194 through the DSI interface, to implement a display function of the mobile phone 100.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The mobile phone 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, Which execute program instructions to generate or change display information.

The display 194 is configured to display interfaces, images, videos, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1.

The external memory interface 120 may be configured to connect to an external storage card, for example, a Micro SD card, to extend a storage capability of the mobile phone 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store a system, an application required by at least one function (for example, a sound playing function or an image playing function), and the like. The data storage area may store data (such as audio data and an address book) and the like created during use of the mobile phone 100. In addition, the internal memory 121 may include a high-speed random access memory, or may include a nonvolatile memory, for example, at least one magnetic disk storage device, a flash memory, or a universal flash storage (universal flash storage, UFS). The processor 110 executes various functional applications of the mobile phone 100 and data processing of the mobile phone 100 by running the instructions stored in the internal memory 121 and/or instructions stored in the memory that is disposed in the processor. In some embodiments, the processor 110 searches for a memory mapping table of a current process, to find all fonts loaded in the internal memory based on a file type of a font, that is, all fonts used by the mobile phone 100. It should be noted that a font file is a file whose name is suffixed with .ttf or a file whose name is suffixed with .woff. The file whose name is suffixed with .tff is a font file created according to a TrueType font standard, and the file whose name is suffixed with .woff is a font file in a Web open font format.

The sensor module 180 may include the touch sensor 180K, and the touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the mobile phone 100, and is located on a position different from that of the display 194.

A software operating system of the mobile phone 100 may use a layered architecture, an event-driven architecture, a microkernel architecture, a micro service architecture, or a cloud architecture. In this embodiment of this application, an Android system of a layered architecture is used as an example to describe the software structure of the mobile phone 100.

Figure 2:
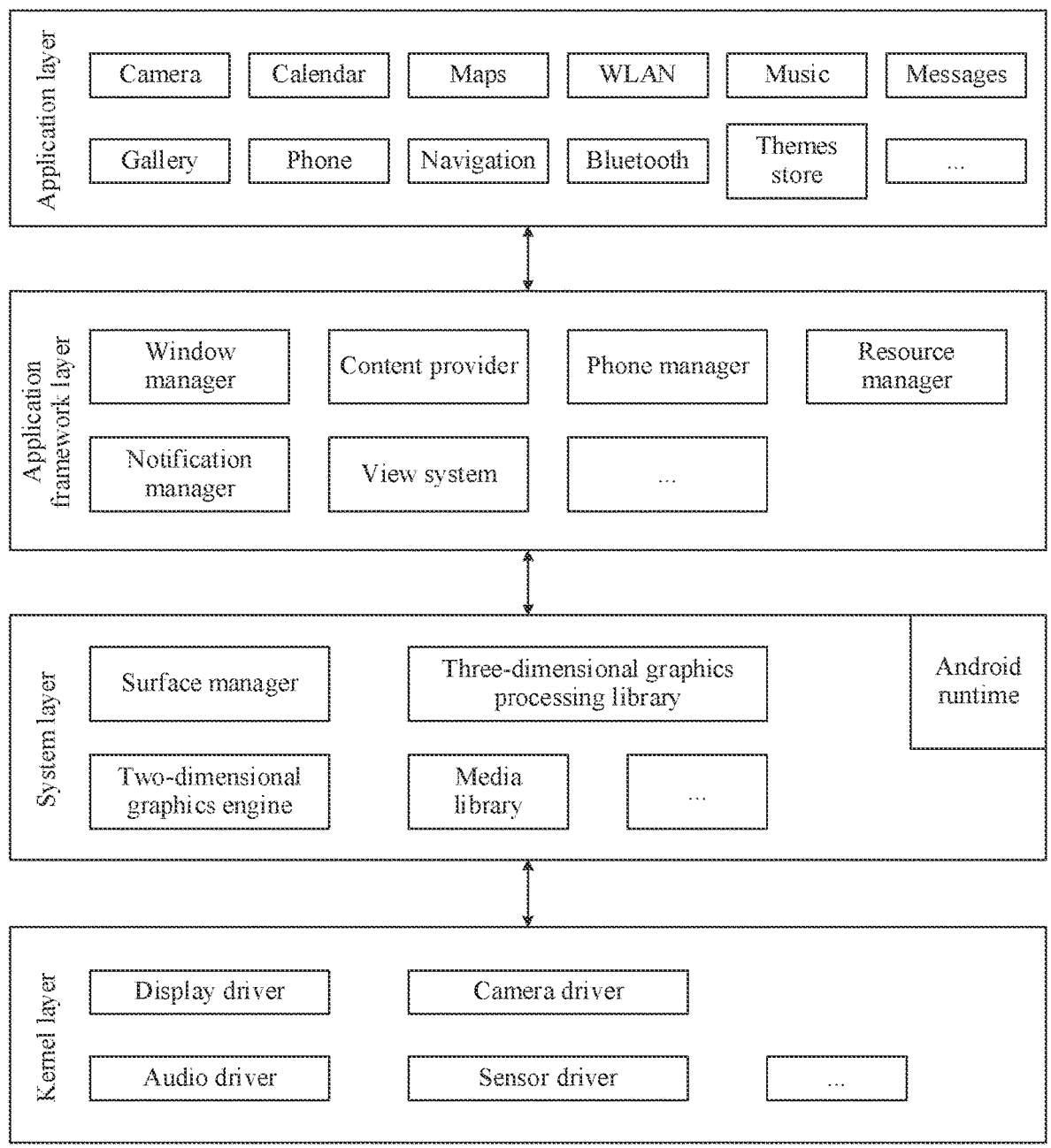
FIG. 2 is a diagram of a software system architecture of a mobile phone according to an embodiment of this application.

FIG. 2 is a block diagram of a software structure of the mobile phone 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, Messages, and Themes store.

The application framework layer (framework layer) provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL, ES), and a 2D graphics engine (for example, SGL and Skia). The graphics processing library also includes a canvas, a color filter, a point, a rectangle, and the like, which may be directly drawn on the display interface of the electronic device.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing. In some embodiments, the foregoing 2D graphics engine may be Skia for drawing and rendering a text.

The kernel layer is a layer between hardware and software. The kernel layer includes at least a display driver, a camera driver, an audio driver, and a sensor driver.

The following describes an example of a working procedure of software and hardware of the mobile phone 100 with reference to a font switching scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a browser application icon. The browser application invokes an interface of the application framework layer to start the gallery application, and then invokes the kernel layer to start a display driver, to display an image by using the display 194.

The following embodiments may be implemented in the mobile phone 100 having the foregoing hardware structure/software structure. In the following embodiments, the mobile phone 100 is used as an example to describe the font switching method provided in embodiments of this application.

Figure 3:
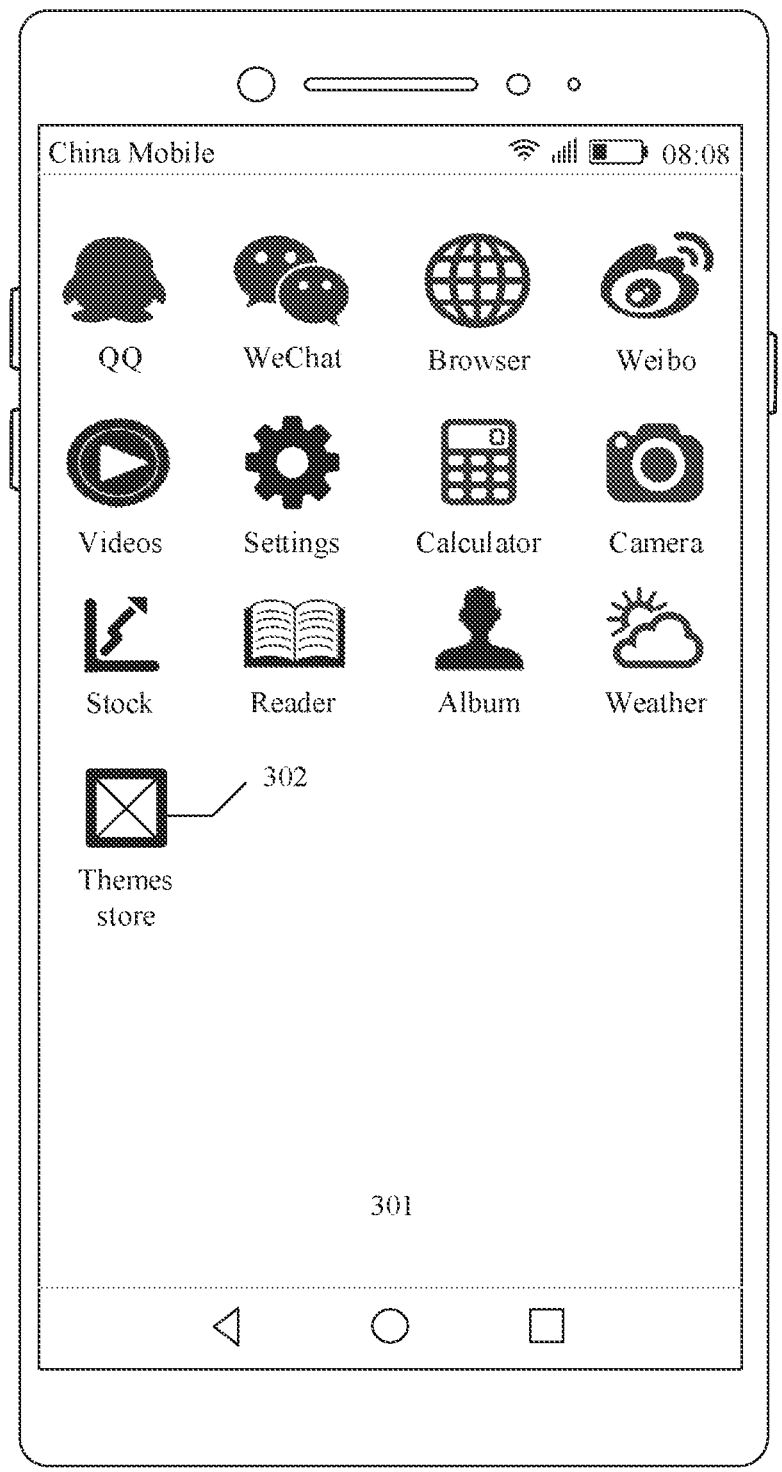
FIG. 3 is a schematic diagram of a graphical user interface of a mobile phone according to an embodiment of this application.
Figure 4:
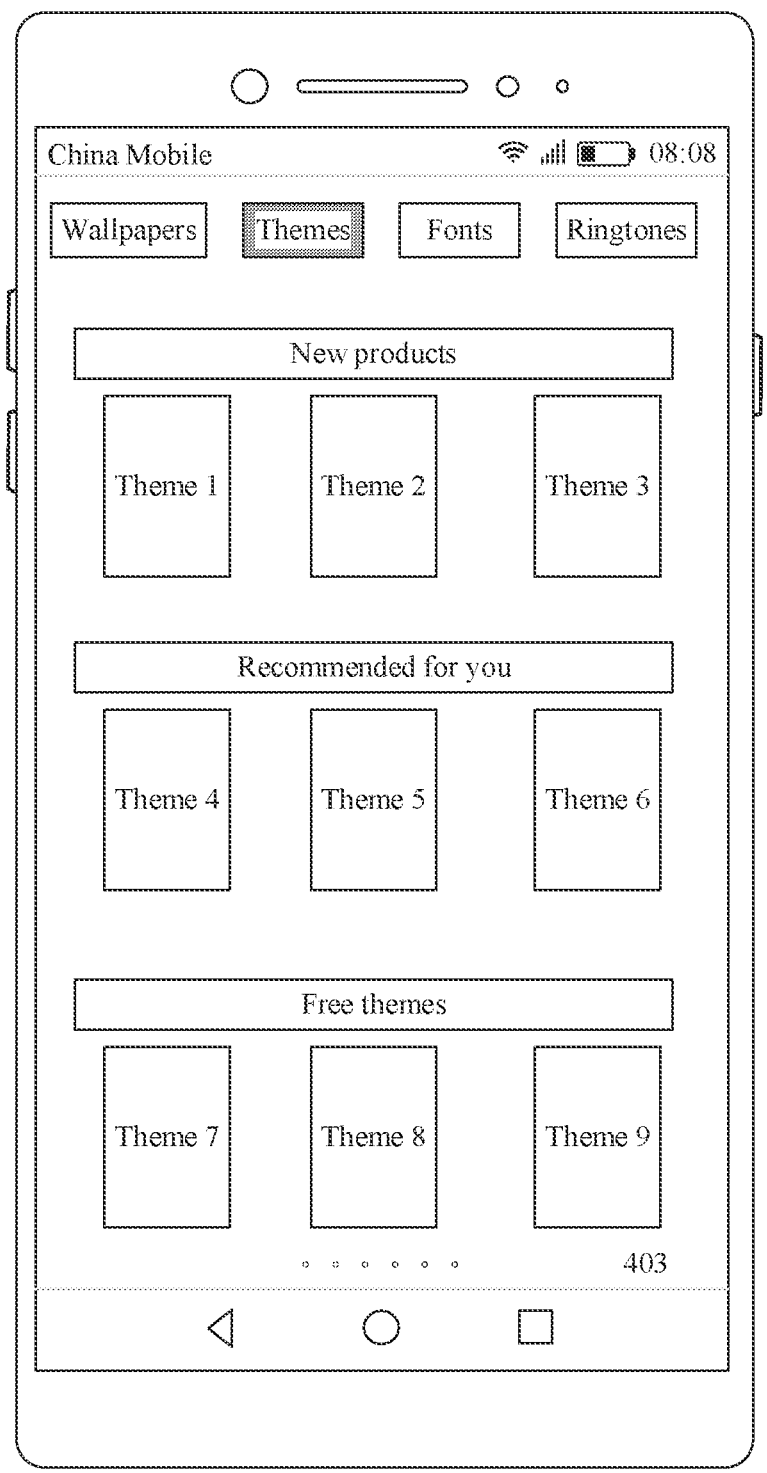
FIG. 4 is a schematic diagram of another graphical user interface of a mobile phone according to an embodiment of this application.

FIG. 3 shows a graphical user interface (Graphical User Interface, GUI) of the mobile phone 100 shown in FIG. 1 and FIG. 2. The GUI may be a desktop 301 of the mobile phone. After detecting an operation of tapping an icon 302 of a Themes store application (Application, APP) on the desktop 301 by a user, the mobile phone may start the Themes store application. FIG. 4 shows another GUI. The GUI may be referred to as a display interface 403 of the Themes store APP. A menu bar 404 in the display interface 403 may include controls such as a theme control, a font control, a wallpaper control, and a ringtone control. The user may enter a specific instruction on a touchscreen to enable the display interface 403 to display a display interface corresponding to the font control, so that the user selects a preferred font and applies the font to an operating system. The specific instruction may be a gesture instruction for sliding on the touchscreen in a specific direction, may be a trigger instruction for tapping a control, or may be another input instruction, which is not limited herein.

Figure 5A:
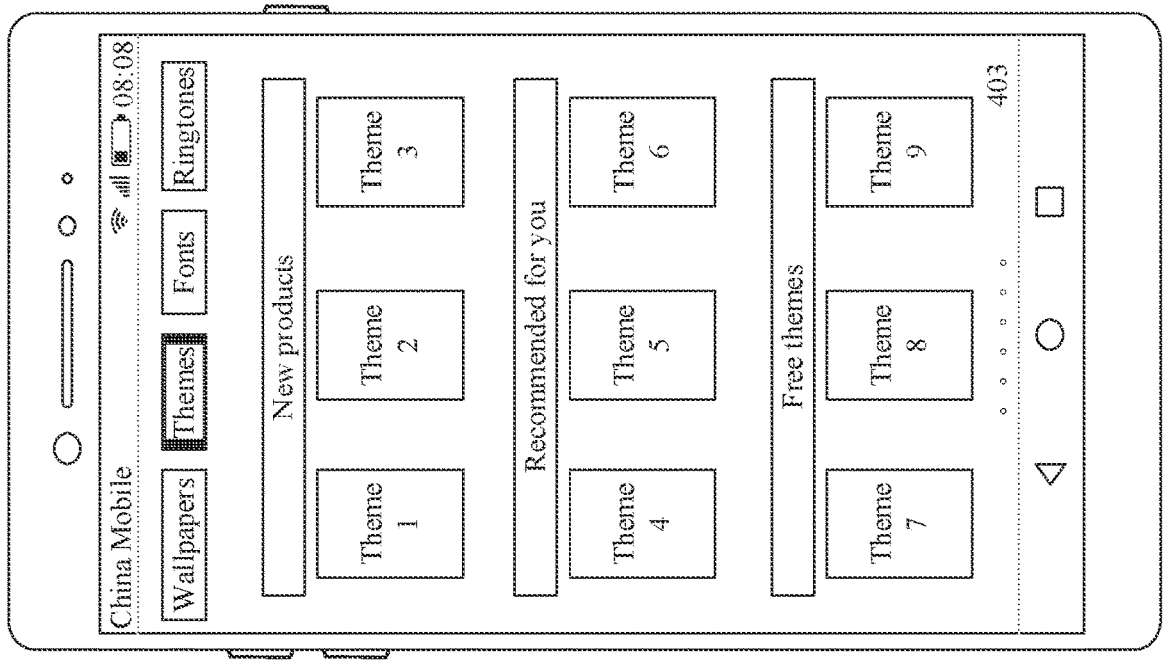
FIG. 5A and FIG. 5B are schematic diagrams of still another graphical user interface of a mobile phone according to an embodiment of this application.
Figure 5B:
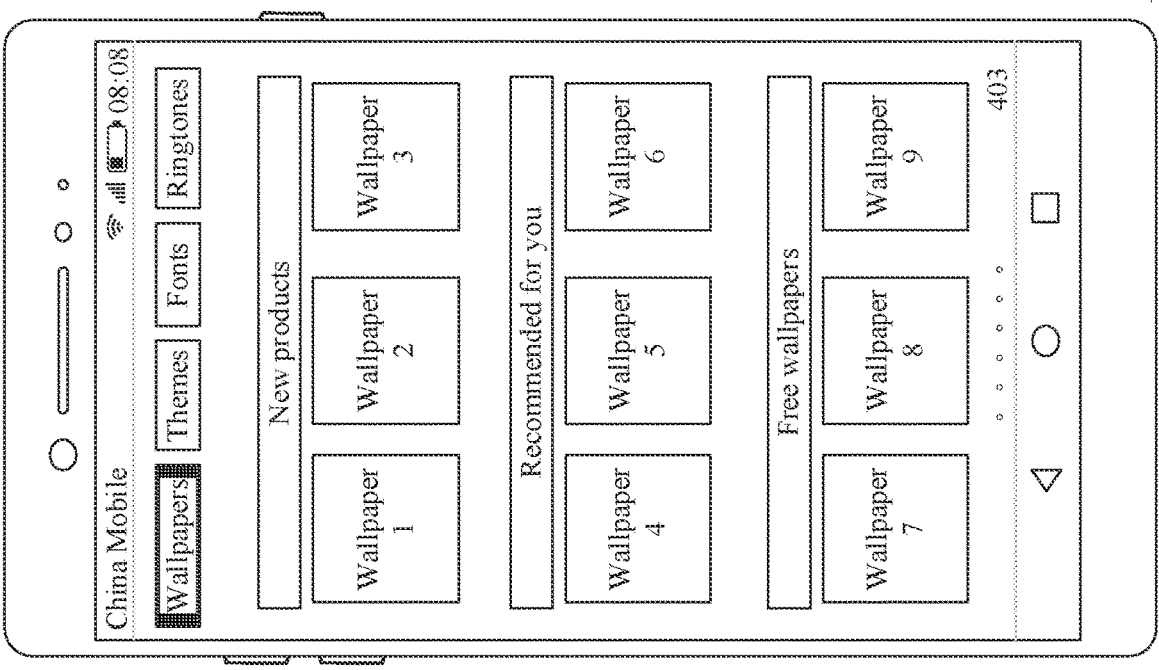
Figure 5B:
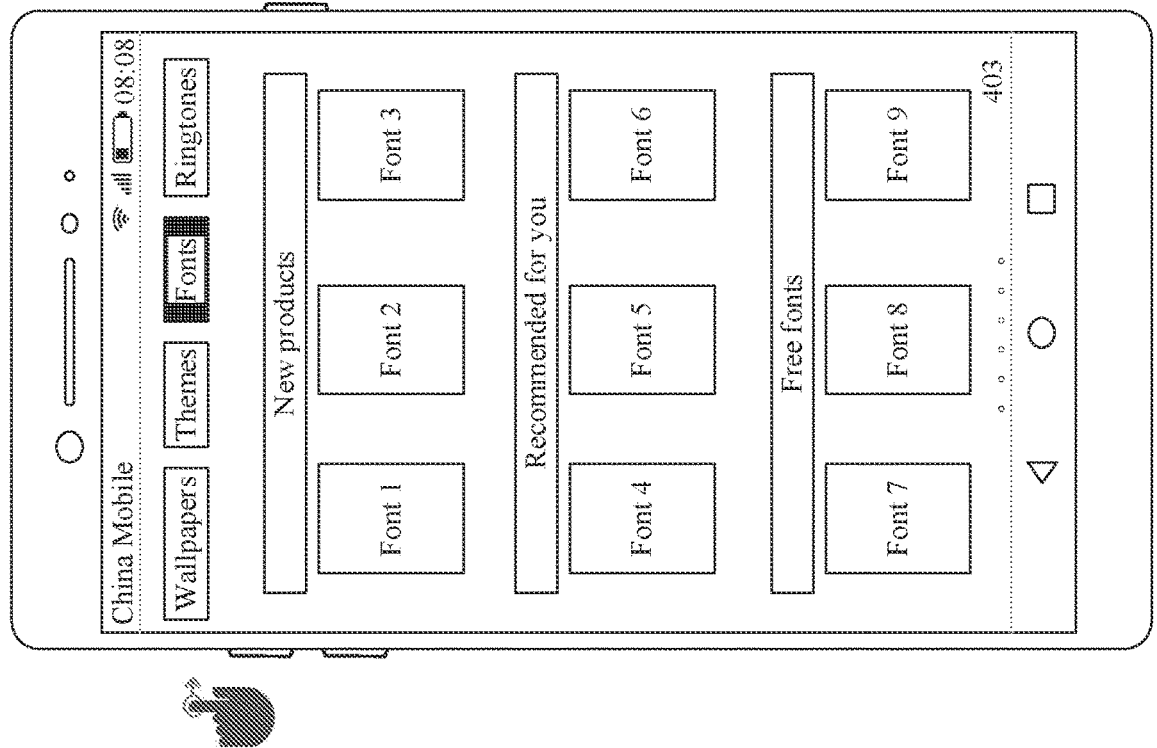
Figure 5B:
Figures 6A, 6B:
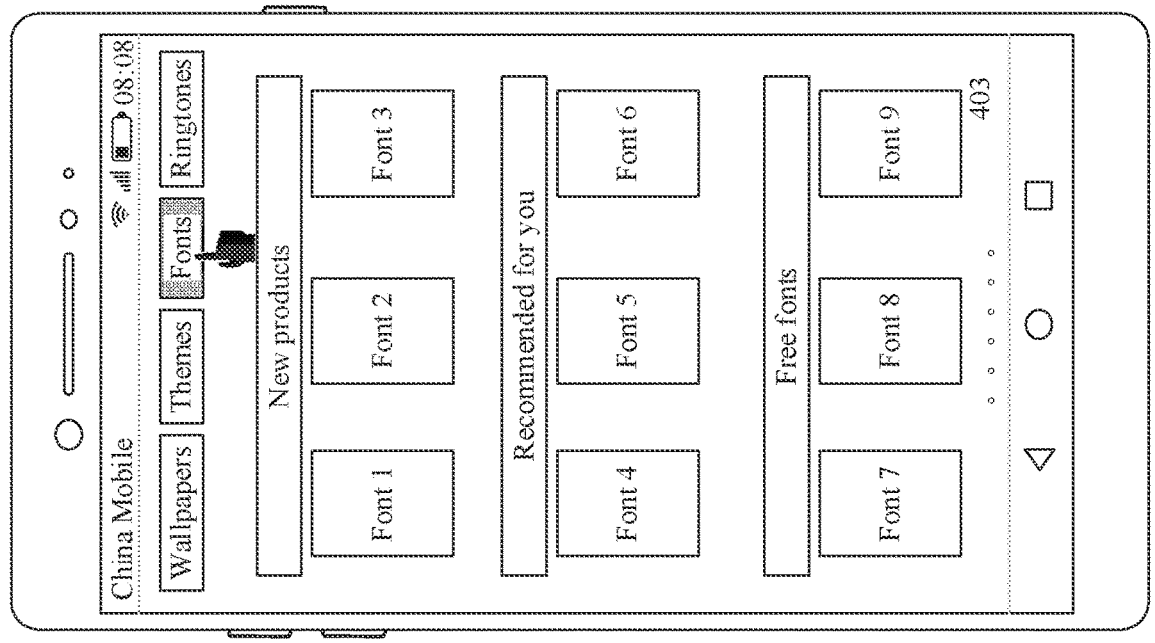
FIG. 6A and FIG. 6B are schematic diagrams of yet another graphical user interface of a mobile phone according to an embodiment of this application.

For example, as shown in FIG. 5A and FIG. 5B, when the Themes store application is started, the display interface 403 first displays an interface corresponding to the theme control. When the user slides leftward on the touchscreen, the display interface 403 displays an interface corresponding to the font control. When the user slides rightward on the touchscreen, the display interface 403 displays a display interface corresponding to the wallpaper control. For example, as shown in FIG. 6A and FIG. 6B, the user may further tap the font control on the menu bar 404, so that the display interface 403 displays the display interface corresponding to the font control. FIG. 7(*a*), FIG. 7(*b*), and FIG.

Figure 7A:
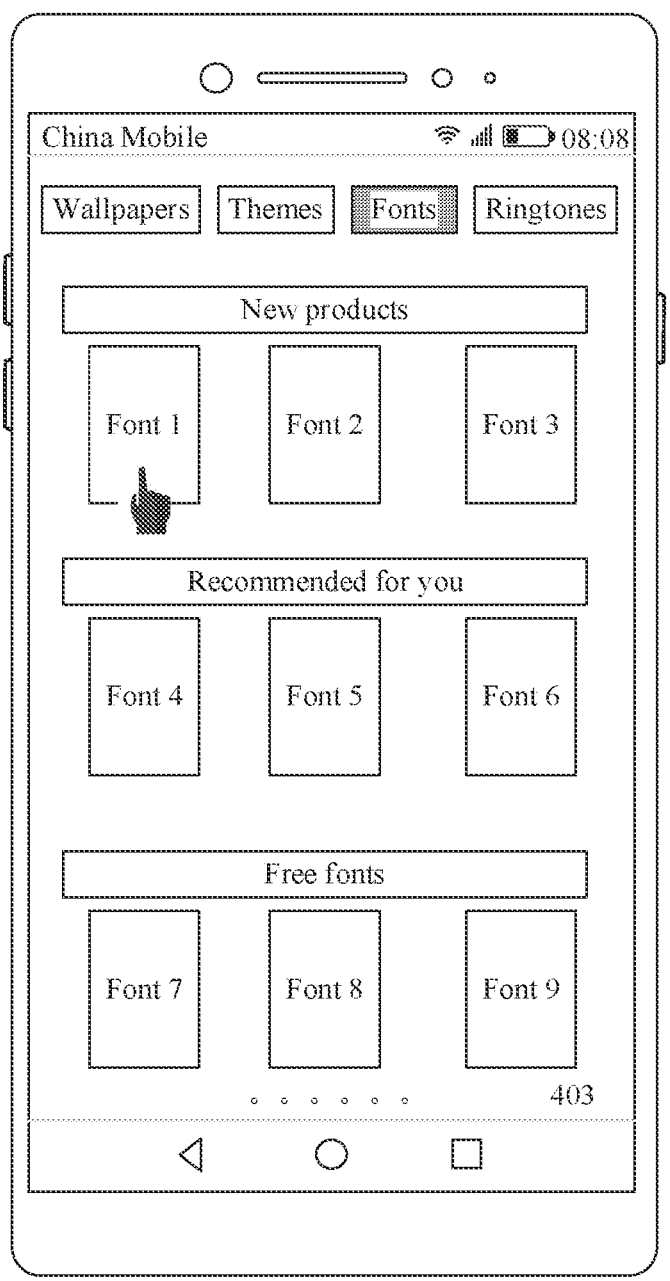
FIG. 7(*a*), FIG. 7(*b*), and FIG. 7(*c*) are schematic diagrams of a display interface of a font control of a Themes store application of a mobile phone according to an embodiment of this application.
Figure 7C:
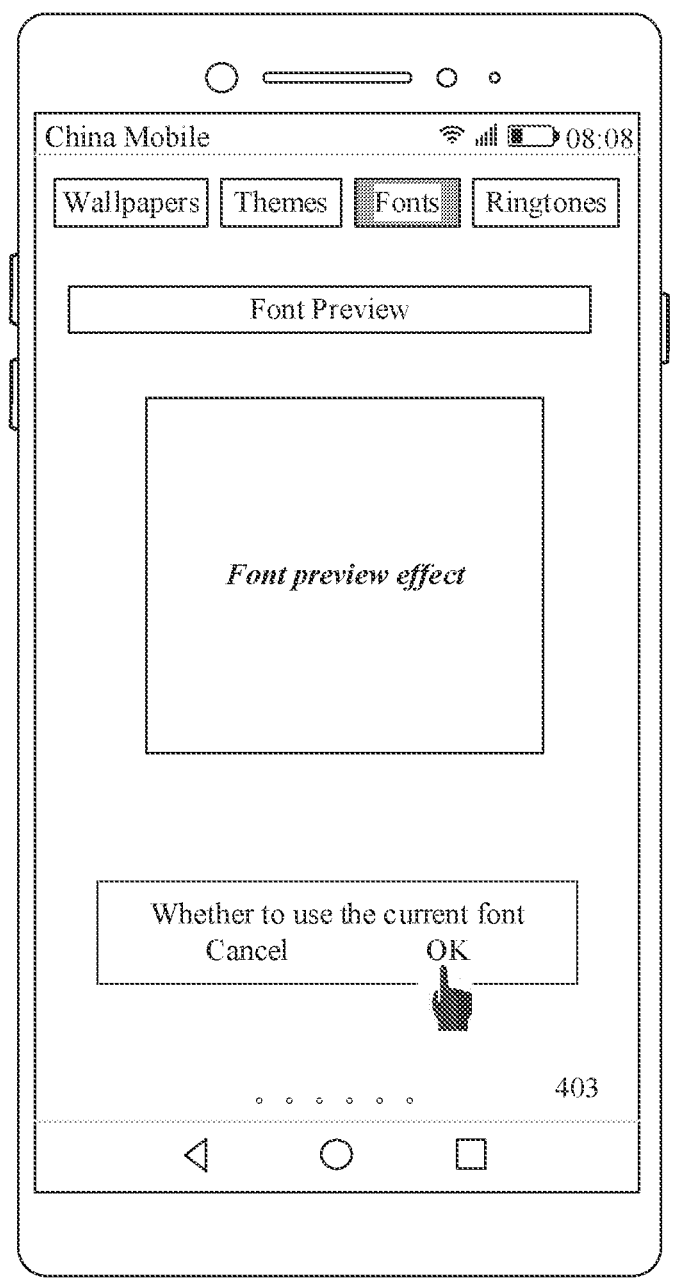

7(c) are schematic diagrams of a display interface corresponding to a font control. As shown in FIG. 7(a), the display interface 403 may display a font selection list. The font selection list may include a plurality of options such as a font1, a font 2, a font 3, and a font 4. After detecting that the user taps an icon of the font 1 on the display interface 403, the mobile phone may display a preview effect of the font 1 and a selection button 405 (as shown in FIG. 7(b)). After detecting that the user taps the selection button 405 on the display interface 403, the mobile phone may display prompt information "Whether to use the current font", and provide "Cancel" and "OK" options (as shown in FIG. 7(c)). After the user selects the "OK" option, the mobile phone applies the font selected by the user to the operating system.

After an operating system interface of the electronic device is switched from a default font to a custom font selected by the user, fonts such as Chinese and English fonts corresponding to selected languages may be drawn by using a control of the operating system based on the language selected in an operating system setting, and the fonts or font libraries corresponding to these fonts are loaded by using a process. For example, in an Android system, a software development kit (Software Development Kit, SDK for short) built in the Android system may be used to draw fonts such as Chinese and English fonts corresponding to the languages selected by the user. Because a control in the operating system is used for presentation, when an application process in the operating system loads a font, for example, a font of a type of a .ttf font file, a record of .ttf font file information is generated in a maps file corresponding to the application process. The record of the .ttf font file information in the maps file is queried, so that all fonts, including custom fonts, used by the current operating system can be obtained.

The Android system is used as an example. Applying a font to the Android system is implemented by using the 2D graphics engine Skia of the Android system. When the Android system needs to load a font, the Android system starts and initializes a zygote. After the zygote is initialized, preloadclass loads a Typeface class. In the Typeface class, jni→skia is invoked to load the font. For example, Class.forName("android.graphics.Typeface") is invoked in preloadClasses( ) to load the Typeface class, and a static block of the Typeface class is invoked. A create( )function invokes a corresponding native method to create a font object, parses a font configuration file by using an init( ) function, and loads the font based on the parsed font configuration file.

It should be noted that the Typeface class is a typeface class used to define a font, includes detailed description information of a specific font, and represents one type of font, for example, Song typeface, regular script, and Gothic typeface. FontID, GlyphID, and a style (style) attribute of the font are defined in the Typeface class. The style attribute can be normal, hold, italic, or bold italic. FontID is an identifier of Font and is globally unique. For example, FontID of bold Song typeface is different from FontID of normal Song typeface, and FontID of Song typeface is also different from FontID of regular script. Font is a font with a style, and may be considered as a subset of the font. For example, when the font is Song typeface, Font may be normal Song typeface, bold Song typeface, italic Song typeface, or bold italic Song typeface. GlyphID is an identifier of a font style of a character in a corresponding font. Glyph of a character can be obtained by using GlyphID. Glyph is a glyph of a font. Each character has its own glyph under a corresponding font. When a display character is rendered, a glyph of the character and other display attributes (for example, a font size, italic typeface, Gothic typeface, italic Gothic typeface, and a color) need to be used for rendering and displaying.

The font configuration files of the Android system are located in a workspace/frameworks/base/data/fonts/folder, and include two files: system_fonts.xml and fallback_fonts.xml. The system_fonts.xml file contains the default font of the operating system. During loading, a corresponding font configuration file is searched for from the system_fonts.xml file. If the font configuration file is not found in the system_fonts.xml file, the font configuration file is searched for from the fallback_fonts.xml file. After the corresponding font configuration file is found, the font configuration file is loaded into Preloading classes, and then the configuration file is parsed by using the init( ) function to obtain font information. The font information includes information about a font style, a font size, a glyph, and the like.

For example, the following is a part of the system_fonts.xml

```
<family>
    <nameset>
        <name>sans-serif</name>
        <name>arial</name>
        <name>helvetica</name>
    </nameset>
    <fileset>
        <file>Roboto-Regular.ttf</file>
        <file>Roboto-Bold.ttf</file>
        <file>Roboto-Italic.ttf</file>
        <file>Roboto-Boldtalic.ttf</file>
    </fileset>
</family>
```

Content between <family> and </family> is referred to as a font family, content between <nameset> and </nameset> is a font name, and content between <fileset> and </fileset> is an invoked font.

However, in this case, a font used by a third-party application (for example, an application such as a browser or a game) cannot accurately vary with a change of a font of an operating system. An existing third-party application usually adapts to a function of varying with a font change of an operating system on a basis of using a Skia library. However, misuse may occur during adaptation of the function. The third-party application software is an application or software that is not built in an operating system, and an application function of a mobile phone may be extended by installing a program developed by a third party. The third-party application software includes but is not limited to instant messaging software, game software, browser software, and the like. It should be noted that, in this embodiment of this application, the foregoing third-party application mainly involves an application that has a webview component or another basic engine related to self-drawing, for example, a browser or a game. For example, the third-party application is a browser herein. A typeface class library exists in a browser kernel. The typeface class library is used to store a typeface class (Typeface class). When the browser needs to render and display characters on a web page after loading the web page, the browser needs to read, from the typeface class library, a typeface class (Typeface class) that can support character display on the web page, and then render the web page by using the read typeface class. An existing font adaptation solution of the third-party application mainly includes the following two solutions. An example in which the third-party application is a browser is used for description.

Solution 1: After the browser is started, the browser reads a font loaded in a current memory and deletes .ttf files (that is, fonts in the system_fonts.xml file) in a font directory system/fonts/of the operating system. If other fonts exist, the browser assumes that these fonts are the fonts currently used by the operating system, and then renders the web page by using a typeface class corresponding to one of these font files in the browser.

Figure 8:
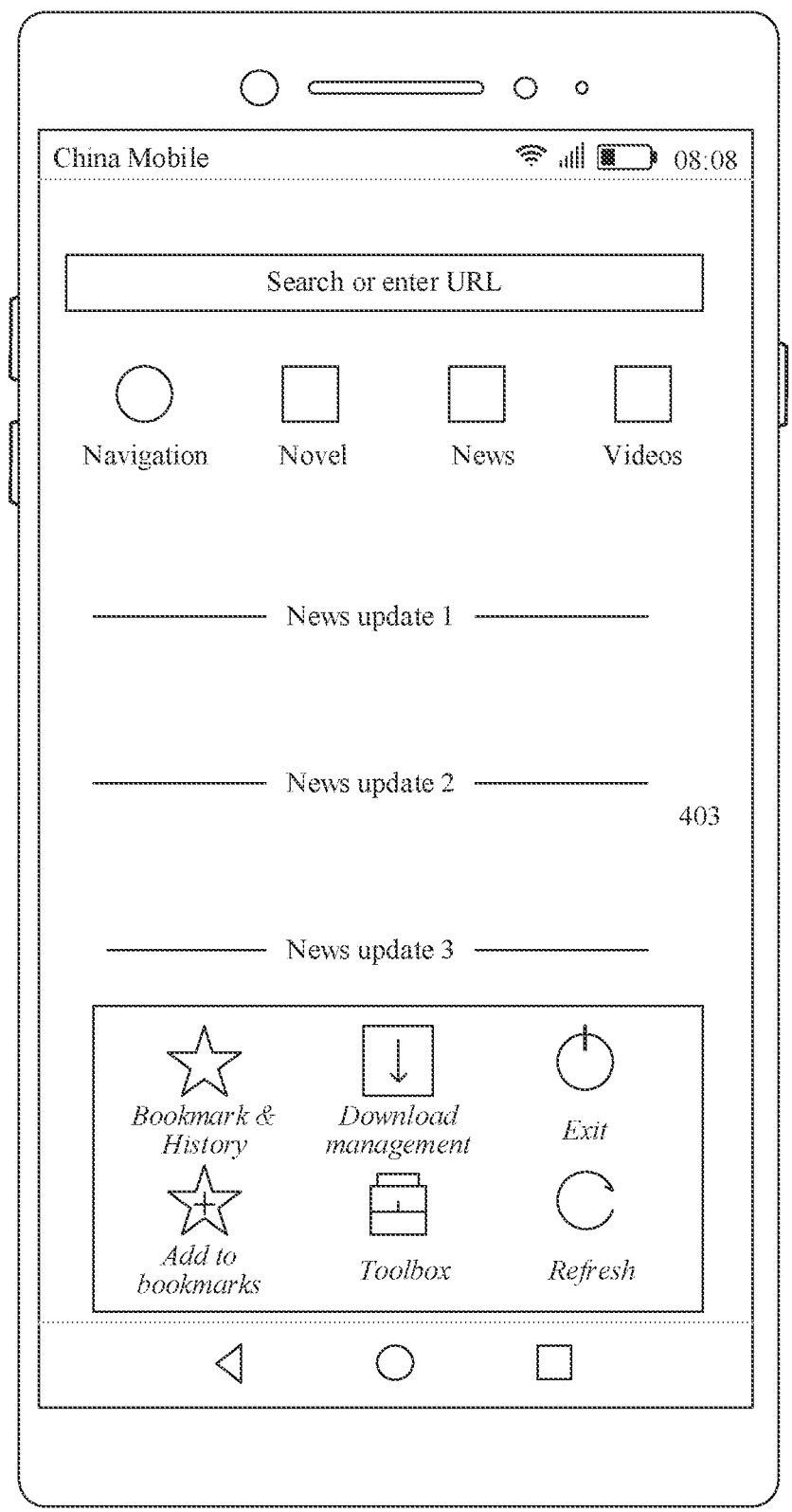
FIG. 8 is a schematic diagram in which a font of a toolbar of an operating system is inconsistent with a font of a web page of a browser in the conventional technology.

However, the font loaded in the memory is not necessarily the font currently used by the operating system (for example, the application actively triggers font loading in a third-party path by using code createTypeFace). In this case, the font used by the browser may be inconsistent with the font currently used by the operating system. In addition, if the memory contains a plurality of font files that are not in the font directory of the operating system (that is, not in the system_fonts.xml file), the font used by the browser may also be inconsistent with the font currently used by the operating system. For example, two font files, namely, font 1.tff and font 2.tff, that are not in the font directory of the operating system exist in the memory. When the font currently used by the operating system is the font 1, according to the mechanism in the solution 1, the browser may use a typeface class corresponding to font 1.tff to render a web page, or may use a typeface class corresponding to font 2.tff to render a web page. It is assumed that the font currently used by the operating system is the font 1, and the browser uses the font 2 to render the web page. In this case, as shown in FIG. 8, a font of a toolbar of the operating system is inconsistent with a font of the web page of the browser.

Solution 2: A directory where a third-party font file (for example, a custom font file or other non-default font files of the operating system) is stored by mainstream vendors is inferred, and related font files in the directory are searched for. If a font file exists in the directory, a typeface class corresponding to the font file is preferentially used to render the web page in the browser.

However, the font file existing in the directory may be a font previously used by the operating system rather than a currently used font, that is, it cannot be determined whether the font existing in the directory is the currently used font. Consequently, the font used by the browser is also inconsistent with the font currently used by the operating system. In addition, if the operating system changes a directory for storing a third-party font, the function of varying with a font change of the operating system becomes invalid. For example, it is assumed that the font file font 1.tff corresponding to the font 1 currently used by the operating system is stored in the directory for storing the third-party font at first, and then the font file font 2.tff corresponding to the font 2 is manually written into the directory by using code. In this case, after the browser is started, the browser uses a typeface class corresponding to font 2.tff to render a web page. Consequently, as shown in FIG. 8, the font of the toolbar of the operating system is also inconsistent with the font of the web page of the browser.

It can be learned that, in an existing solution in which the font used by the third-party application adapts to the font used by the operating system, font misuse is still possible, that is, the font used by the third-party application cannot accurately vary with a change of the font used by the operating system of the electronic device, and consequently, the font by the third-party application software is inconsistent with the font used by the operating system. In this application, a target dot matrix is created based on the font currently used by the operating system. All fonts loaded in a process (all fonts used by the operating system) are found. Pixel matching is performed on comparison dot matrices corresponding to these fonts and the target dot matrix. Then, a comparison dot matrix matching the target dot matrix is found from the comparison dot matrices, and a font corresponding to the comparison dot matrix is used as the target font. Then, a font of the third-party application is switched to the target font, so that the font used by the third-party application can be consistent with the font used by the operating system of the electronic device. This prevents the font used by the third-party application software from being inconsistent with the font used by the operating system.

Figure 9:
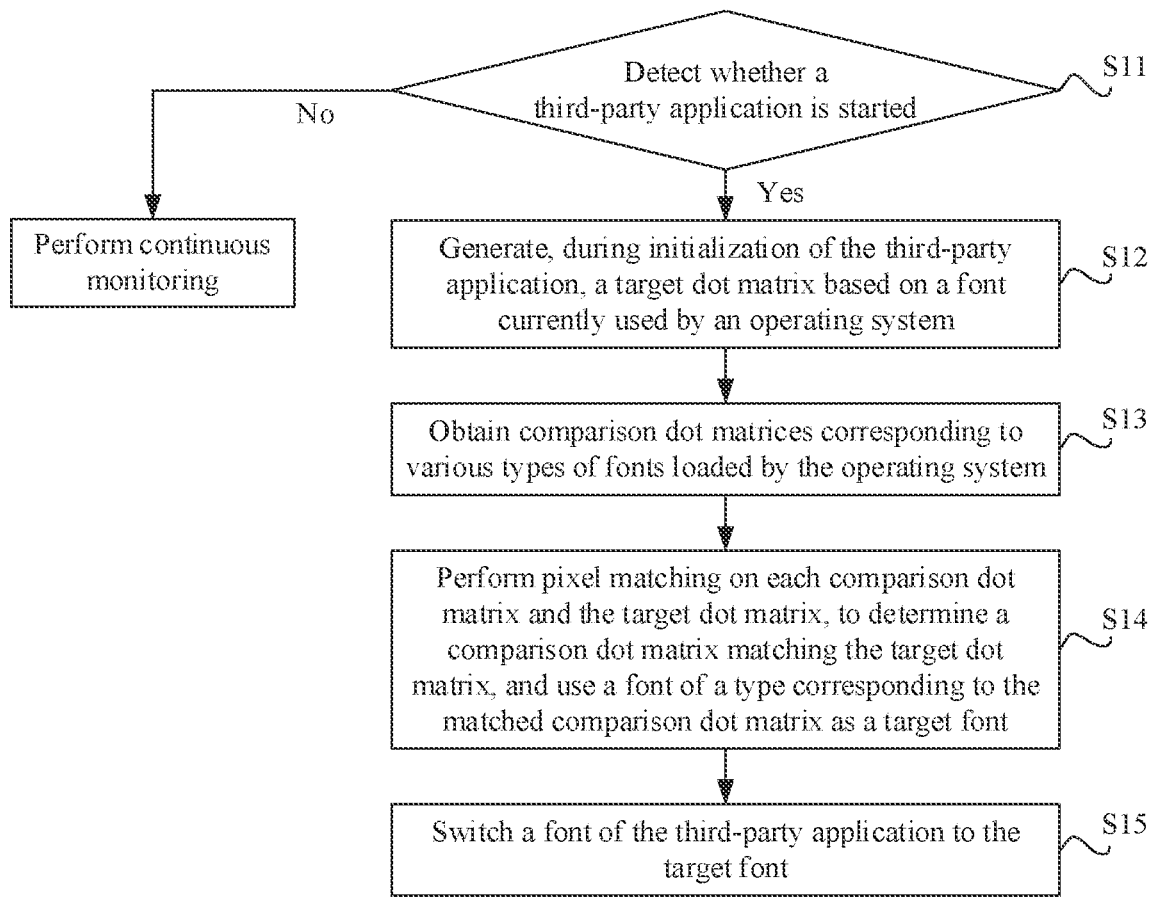
FIG. 9 is a schematic flowchart of a font switching method according to an embodiment of this application.

FIG. 9 is a schematic flowchart of a font switching method according to an embodiment of this application. In this embodiment, a procedure is executed by an electronic device. As shown in FIG. 9, the font switching method provided in this embodiment includes S11 to S15. Details are as follows:

S11: Detect whether a third-party application is started. If the third-party application is started, perform S12; otherwise, perform continuous monitoring.

During specific application, an operating system of an electronic device may set a monitoring program (for example, a hook program) in a process management service, to detect whether the third-party application is started. For example, an Android system may set a monitoring program in ActivityManagerService, and detect, by using the monitoring program, whether the third-party application is started. It should be noted that the monitoring program may continuously and cyclically monitor a top of an Activity stack, and then return first information when detecting that an identifier of a process at the top of the Activity stack is consistent with a unique identifier of the third-party application. The first information is used to notify the operating system that starting of the third-party application is detected. It should be noted that ActivityManagerService is a system process management service that is provided by the Android system and that is used to manage a running status of Activity. Activity is a component responsible for interacting with a user in the Android system, which can implement interaction with the user, can display a specified control by using setContentView(View), and can obtain an operation performed by the user on a screen of the electronic device. It should be further noted that a plurality of third-party applications may be set in the monitoring program. When it is detected that the identifier of the process at the top of the Activity stack is consistent with a unique identifier of any of the plurality of third-party applications, it indicates that the operating system is starting the third application corresponding to the unique identifier. It should be noted that the unique identifier of the third-party application is used to distinguish between applications. In this embodiment, the unique identifier of the third-party application may be a package name (packageName) of the third-party application. It should be further noted that the unique identifier of the third-party application may alternatively be ApplicationId that is set by a developer for the application during development. Details are not described herein again.

In this embodiment, whether the user taps/touches the third-party application may be further detected by using a touchscreen, to detect whether the third-party application is started. If it is detected that the user taps/touches the third-party application by using the touchscreen, it indicates that the third-party application is started; otherwise, the third-party application is not started. For example, the third-party application may be started when the user taps the third-party application. The electronic device detects, in real time by using the touchscreen, whether the user taps the third-park application. When it is detected that the user taps the third-party application, a corresponding hardware interrupt is sent to the kernel layer. The kernel layer processes the tap operation into an original input event (including information such as tap coordinates and a time stamp of the tap operation). The original input event is stored at the kernel layer. An application framework layer obtains the original input event from the kernel layer, and identifies a control (that is, a third-party application) corresponding to the input event. For example, the touch operation is a touch tap operation, and a control corresponding to the tap operation is a control of a browser application icon. The browser application invokes an interface of the application framework layer to start the gallery application, and then invokes the kernel layer to start a display driver, to display an image by using the display 194, in this way, the operating system starts the third-party application. It should be noted that the foregoing touch operation may alternatively be a plurality of operations such as a double-tap touch, a touch and hold, and a short-tap touch. This is not limited herein.

During specific application, it may be further determined whether there is a process of the third-party application in all processes of the electronic device. If there is the process of the third application in the processes of the electronic device, it indicates that the third-party application is started; otherwise, it indicates that the third-party application is not started. Specifically, activities that are running in the operating system of the electronic device may be obtained by using ActivityManger. The activities include information about a process Process), an application package, a service (Service), and a task (Task). Then, the unique identifier of the third-party application is obtained. All processes of the electronic device are obtained by using an enhanced for loop. Then, query is performed based on the unique identifier of the third-party application, to find whether there is a process consistent with the unique identifier of the third-party application in all processes of the electronic device. If there is the process, it indicates that the third-party application is started; otherwise, it indicates that the third-party application is not started.

S12: Generate, during initialization of the third-party application, a target dot matrix based on a font currently used by the operating system.

Specifically, when the electronic device detects that the third-party application is started, the third-party application performs an initialization operation. During the initialization operation, an application programming interface (application programming interface, API) provided by the operating system of the electronic device is invoked to load a custom font currently, used by the operating system, and the target dot matrix that can be used for pixel comparison is created based on the custom font. It should be noted that the target dot matrix is a dot matrix that can reflect a font feature of a font currently used by the operating system, and may be specifically a dot matrix generated by drawing a segment of text by using the font currently used by the operating system, for example, a bitmap (bitmap) or a pixel map. The dot matrix is an image including n pixels, and a display effect of the dot matrix is implemented by an arrangement of a pixel array. When an operation is performed on the dot matrix, specifically, on each pixel in the dot matrix, that is, an object of the operation is each pixel. Attributes such as hue, saturation, and transparency of the pixel may be changed, to change the display effect of the dot matrix. Different arrangements and coloring may be performed on the pixel to form different images.

For example, the foregoing third-party application is a browser. In this embodiment, when the browser is started, the browser performs initialization of a font library. When the browser performs initialization of the font library, the operating system reads a font file stream of a custom font by using a custom font file, and then generates the target dot matrix based on the font file stream of the custom font. The font file stream is a data stream including binary data of a font. The foregoing browser may be an independent browser application, or may be an application that uses a browser kernel to display a web page. This is not limited herein.

Figure 10:
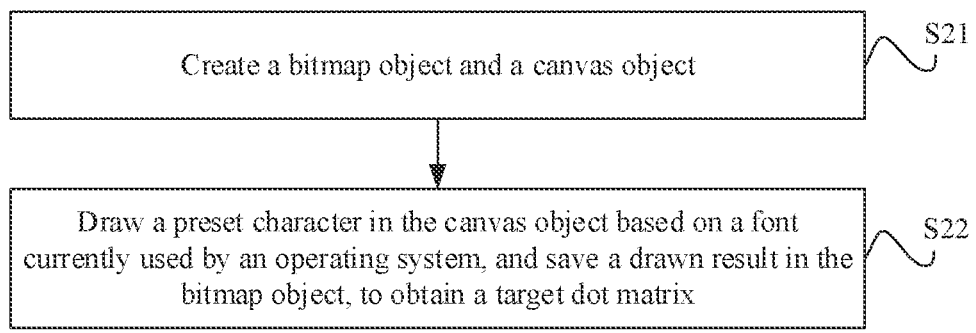
FIG. 10 is a schematic flowchart of a method for generating a target dot matrix based on a font currently used by an operating system according to an embodiment of this application.

For a specific process of generating a target dot matrix of a font, refer to FIG. 10. FIG. 10 is a schematic flowchart of a method for generating a target dot matrix based on a font currently used by an operating system according to this embodiment. As shown in FIG. 10, the method may include S21 to S22. Details are as follows:

S21: Create a bitmap object and a canvas object.

In this embodiment, when it is detected that the third-party application is started, the operating system of the electronic device automatically invokes an API for creating the bitmap object to create an empty bitmap object (bitmap), for example, creates an empty bitmap by using a Bitmap createBitmap API. Then, the canvas object (canvas) is created, and parameters of the bitmap object are set into the canvas object, so that an image drawn in the canvas object can be saved in the bitmap object.

S22: Draw a preset character in the canvas object based on the font currently used by the operating system, and save a drawn result in the bitmap object, to obtain the target dot matrix.

During specific application, the preset character is first drawn in the canvas object by using a font file stream corresponding to the font currently used by the operating system, and then the preset character is saved in the bitmap object. In this case, the saved bitmap object (bitmap) is the target dot matrix generated by using the font currently used by the operating system. To improve accuracy of automatic comparison, a font size and character content of the drawn preset character need to be set. For example, the character content may be set to "This is a test text", and the font size may be set to 48px. A preset character whose font size is 48px and character content is "This is a test text" is drawn in the canvas object by using the font file stream corresponding to the font currently used by the operating system, and stored in the bitmap object, to obtain the target dot matrix (bitmap target) shown in FIG. 11. It may be understood that the character content and the font size may be set based on a requirement. Details are not described herein again. It may be further understood that a size of the bitmap affects a matching effect. A larger size of the bitmap indicates higher matching precision and higher accuracy, but causes a decrease in glyph comparison efficiency. Therefore, a larger font size is not always preferred. To achieve better comparison precision and comparison efficiency, it is found through tests that a font size of 48px may be selected, and in this case, a bitmap size of 64*64 is obtained.

To reduce memory space occupied by the target dot matrix, the bitmap object may alternatively be a monochromatic bitmap object. The monochromatic bitmap object is a bitmap object including only two colors: black and White. "0" is used to represent a black pixel, and "1" is used to represent a white pixel.

S13: Obtain comparison dot matrices corresponding to various types of fonts loaded by the operating system.

In this embodiment, the various types of fonts loaded by the operating system of the foregoing electronic device may be all types of fonts (including a default font of the operating system and a non-default font of the operating system) loaded by the operating system, or may be the non-default font of the operating system loaded by the operating system of the electronic device. It may be understood that, in this application, the font used by the third-party application accurately varies with a change of the font used by the operating system. Therefore, the various types of fonts loaded by the operating system include at least two fonts. One is a font used before the operating system changes the font, and the other is a font used after the operating system changes the font.

It should be noted that comparison dot matrices corresponding to the various types of fonts may be created when the operating system loads the fonts, and the pre-created comparison dot matrices are stored in a preset storage location. The preset storage location may be set based on an actual requirement. This is not limited, and details are not described herein again.

During specific application, the various types of fonts loaded by the operating system may be obtained first, and then the comparison dot matrices corresponding to the various types of fonts is generated based on font file streams corresponding to the various types of fonts. Specifically, the comparison dot matrices that correspond to the various types of fonts and that are in the various types of fonts may be generated in the foregoing manner of generating the target dot matrix. To be specific, the preset characters are drawn in the canvas objects based on the font file streams corresponding to the various types of fonts, and then drawn results are saved in the bitmap objects corresponding to the various types of fonts, to obtain the comparison dot matrices corresponding to the various types of fonts. A plurality of new bitmaps (whose quantity is consistent with a quantity of fonts of various types) and corresponding canvases are created by invoking an original API of the operating system, then the preset characters are drawn respectively in canvases corresponding to the various types of fonts based on the various types of fonts, and then the preset characters are saved in the bitmap, to obtain the comparison dot matrices corresponding to the various types of fonts.

Figure 11:
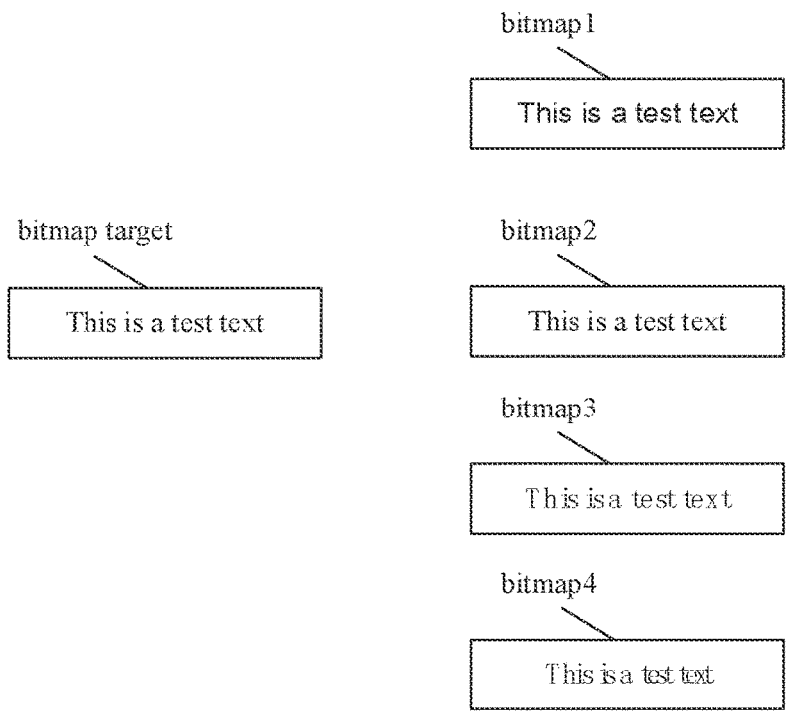
FIG. 11 is a schematic diagram of a target dot matrix and a comparison dot matrix according to an embodiment of this application.

Still refer to FIG. 11. For example, it is assumed that various types of fonts loaded by the operating system include four types of fonts, namely, a font1, a font 2, a font 3, and a font 4. Four bitmap objects, namely, bitmap1, bitmap2, bitmap3, and bitmap4, are created by invoking the original API of the operating system. Canvas 1 is created based on bitmap1, canvas2 is created based on bitmap2, canvas3 is created based on bitmap3, and canvas4 is created based on bitmap4. In canvas1, a preset character whose font size is 48px and character content is "This is a test text" is drawn by using a font file stream corresponding to the font1, and a drawn result is saved in bitmap1. In canvas2, a preset character whose font size is 48px and character content is "This is a test text" is drawn by using a font file stream corresponding to the font 2, and a drawn result is saved in bitmap2, In canvas3, a preset character whose font size is 48px and character content is "This is a test text" is drawn by using a font file stream corresponding to the font 3, and a drawn result is saved in bitmap3. In canvas4, a preset character whose font size is 48px and character content is "This is a test text" is drawn by using a font file stream corresponding to the font 4, and a drawn result is saved in bitmap4. In this case, bitmap1 is a comparison dot matrix corresponding to the font 1, bitmap2 is a comparison dot matrix corresponding to the font 2, bitmap3 is a comparison dot matrix corresponding to the font 3, and bitmap4 is a comparison dot matrix corresponding to the font 4.

Figure 12:
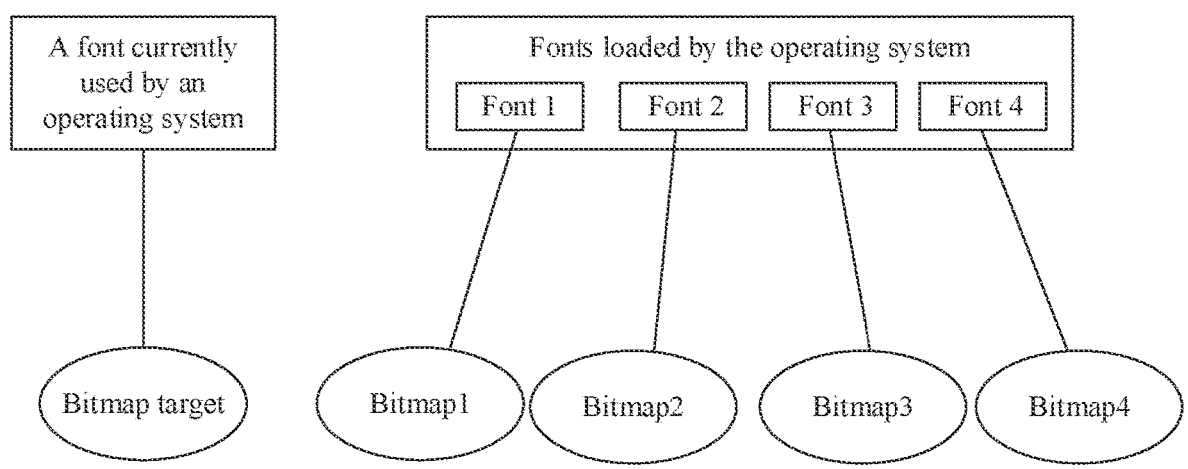
FIG. 12 is a schematic diagram in which a target dot matrix is generated and a comparison dot matrix is generated according to an embodiment of this application.

It should be noted that, when a preset character is drawn on the comparison dot matrix, the preset character whose font size and character content are the same as those during drawing of the target dot matrix needs to be drawn. Because generated bitmaps are generated in a same font size, bitmap sizes of the obtained character are also the same. In this way, normalization processing can be effectively avoided, and precision during pixel comparison can be improved. For example, it is assumed that the font currently used by the operating system is the font 1. Refer to FIG. 12. The electronic device may generate, based on the font 1, a target dot matrix (bitmap target) corresponding to the font 1, and then generate, based on the font 1, the font 2, the font 3, and the font 4 that are loaded by the operating system, comparison dot matrices bitmap 1, bitmap2, bitmap3, and bitmap4 corresponding to the font 1, the font 2, the font 3, and the font 4.

It should be further noted that, in this embodiment, the electronic device may first obtain the comparison dot matrix, and then generate the target dot matrix based on the font currently used by the operating system. The comparison dot matrix may also be obtained while the target dot matrix is generated based on the font currently used by the operating system. That is, there is no strict time sequence execution relationship between the step S12 and the step S13. The step S12 may be performed before the step S13, the step S12 may be performed after the step S13, or the step S12 and the step S13 may be performed simultaneously. This is not particularly limited in this embodiment.

Figure 13:
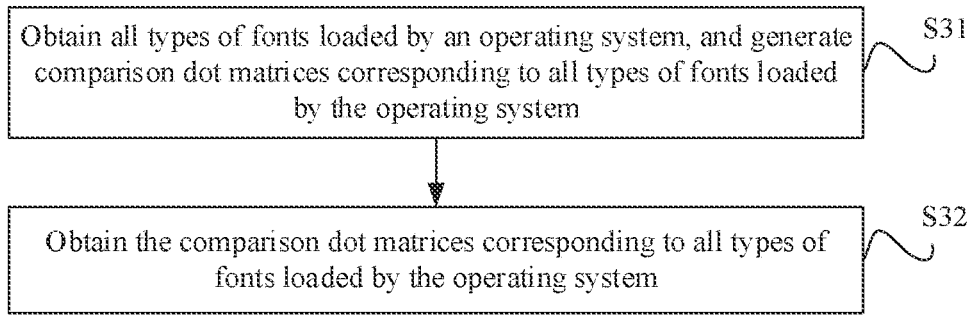
FIG. 13 is a schematic flowchart of a method for obtaining a comparison dot matrix according to an embodiment of this application.

FIG. 13 is a schematic flowchart of a method for obtaining a comparison dot matrix according to this embodiment. As shown in FIG. 13, the method may include S31 to S32. Details are as follows:

S31: Obtain all types of fonts loaded by the operating system, and generate comparison dot matrices corresponding to all types of fonts loaded by the operating system.

During specific application, each application process in the operating system of the electronic device corresponds to a maps file (/proc/self/maps). In the maps file, there are some reference records of fonts of .ttf font file types. These reference records are used to record referenced .ttf font files. A file suffixed with .ttf is a font file referenced by a current process, that is, a font loaded by the operating system. The .ttf file in the maps file is invoked by using a "/pros/self/maps/grep ttf" command, to obtain all font files (files suffixed with .ttf) loaded by the operating system, and then obtain various types of fonts loaded by the operating system. It may be understood that the font currently used by the operating system definitely exists in the various types of fonts loaded by the operating system. Therefore, a font obtained through the foregoing operations definitely includes the font currently used by the operating system.

During specific application, the preset character is drawn in the canvas object based on the font file streams that correspond to the various types of fonts and that are in the various types of fonts loaded by the operating system, and then saved in the bitmap object corresponding to each comparison font file, so that the comparison dot matrix corresponding to each comparison font file can be obtained.

For example, it is assumed that the various types of obtained font files loaded by the operating system include the font 1, the font 2, the font 3, and the font 4. Four bitmap objects, namely, bitmap1, bitmap2, bitmap3, and bitmap4, are created by invoking the original API of the operating system. Then, canvas1 is created based on bitmap1, canvas2 is created based on bitmap2, canvas3 is created based on bitmap3, and canvas4 is created based on bitmap4. In canvas1, a preset character whose font size is 48px and character content is "This is a test text" is drawn by using a font file stream corresponding to the font 1, and a drawn result is saved in bitmap1. In canvas2, a preset character whose font size is 48px and character content is "This is a test text" is drawn by using a font file stream corresponding to the font 2, and a drawn result is saved in bitmap2. In canvas3, a preset character whose font size is 48px and character content is "This is a test text" is drawn by using a font file stream corresponding to the font 3, and a drawn result is saved in bitmap3. In canvas4, a preset character whose font size is 48px and character content is "This is a test text" is drawn by using a font file stream corresponding to the font 4, and a drawn result is saved in bitmap4. In this case, bitmap1 is a comparison dot matrix corresponding to the font 1, bitmap2 is a comparison dot matrix corresponding to the font 2, bitmap3 is a comparison dot matrix corresponding to the font 3, and bitmap4 is a comparison dot matrix corresponding to the font 4.

S32: Obtain the comparison dot matrices corresponding to all types of fonts loaded by the operating system.

During specific application, the comparison dot matrix generated based on S31 may be stored in a specific storage location, and the comparison dot matrix can be obtained by searching for a file in the location.

In an embodiment, a custom font selected by the user by using an application such as Themes store is usually not included in the default font of the operating system. Therefore, the foregoing various types of fonts loaded by the operating system may alternatively be the non-default font of the operating system loaded by the operating system of the electronic device. This can effectively reduce a quantity of comparison dot matrices, improve processing efficiency, and reduce occupation of system resources. The following describes a process of obtaining the comparison dot matrix by using an example in which the various types of fonts loaded by the operating system are non-default fonts of the operating system loaded by the operating system of the electronic device.

Figure 14:
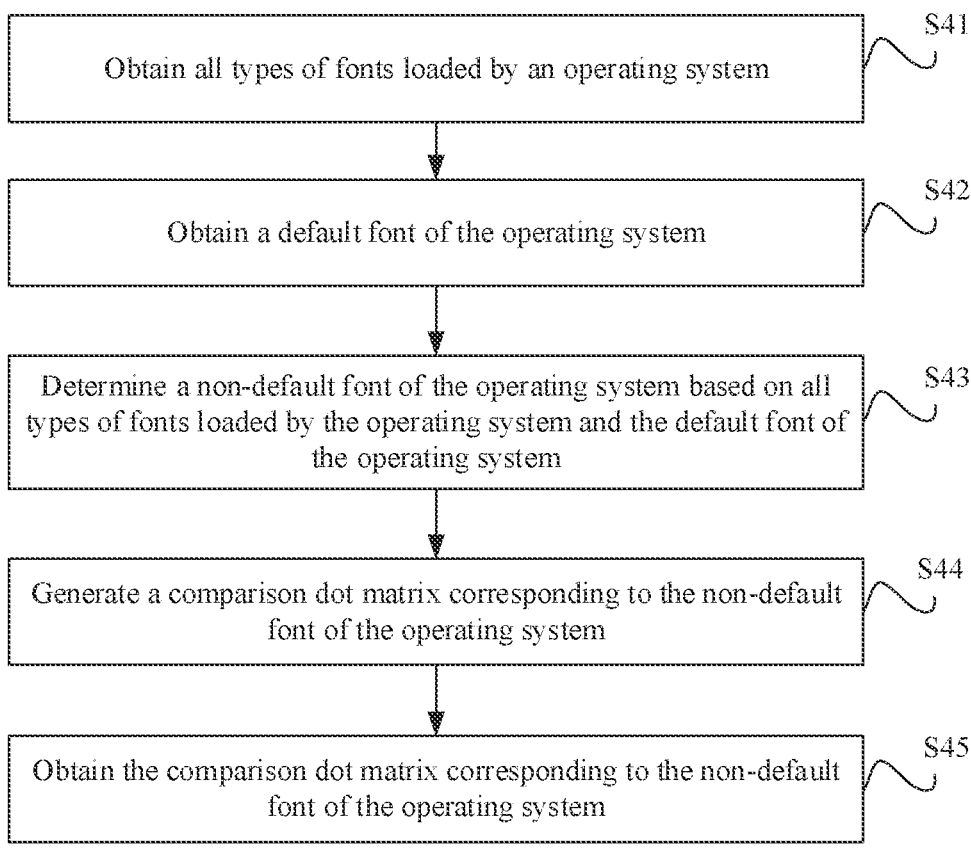
FIG. 14 is a schematic flowchart of another method for obtaining a comparison dot matrix according to an embodiment of this application.

FIG. 14 is a schematic flowchart of another method for obtaining a comparison dot matrix according to this embodiment. As shown in FIG. 14, the method may include S41 to S45. Details are as follows:

S41: Obtain all types of fonts loaded by the operating system.

Similarly, to determine the non-default fonts of the operating system loaded by the operating system, the various types of fonts loaded by the operating system need to be obtained first, and then the default font of the operating system is deleted from the various types of fonts loaded by the operating system, so that remaining fonts are the non-default fonts loaded by the operating system. A specific obtaining process is similar to S31, and details are not described herein again.

S42: Obtain the default font of the operating system.

During specific application, the default font of the operating system is a default font built in the operating system, for example, a font used in factory setting of the electronic device. It may be understood that the default font of the operating system may include only one default font, or may include a plurality of default fonts; and may include an English default font, or may include a Chinese default font. This is not limited herein.

During specific application, there is usually a specific configuration file for storing description information related to the default font built in the operating system, and the default font of the operating system can be obtained by using the specific configuration file. The specific configuration file may be determined based on different operating systems. For example, a configuration file of a default font of an Android system is a system_fonts.xml file located in a workspace/frameworks/base/data/fonts/folder. Therefore, the default font of the operating system may be obtained by obtaining the system_fonts.xml file located in the workspace/frameworks/base/data/fonts/ folder. Specifically, a font type may be determined by using content between <fileset> and <fileset>.

S43: Determine the non-default font of the operating system based on all types of fonts loaded by the operating system and the default font of the operating syste.

During specific application, after the default font of the operating system is deleted from all fonts loaded by the operating system, the non-default font of the operating system may be determined.

For example, if all the obtained fonts loaded by the operating system include five fonts: a font1, a font 2, a font 3, a font 4, and a font 5, and the obtained default fonts of the operating system include two fonts: the font 1 and the font 3, the non-default fonts of the operating system include three fonts: the font 2, the font 4, and the font 5.

S44: Generate a comparison dot matrix corresponding to the non-default font of the operating system.

Herein, the preset characters are drawn in the canvas objects based on font file streams corresponding to the non-default fonts of the operating system, and then the drawn results are saved in bitmap objects corresponding to the various types of fonts, so that the comparison dot matrices corresponding to the various types of fonts can be obtained.

For example, it is assumed that all the obtained fonts loaded by the operating system include five fonts: a font 1, a font 2, a font 3, a font 4, and a font 5. The obtained default fonts of the operating system include two fonts: the font 1 and the font 3. That is, the non-default fonts of the operating system include three fonts: the font 2, the font 4, and the font 5. Three bitmap objects bitmap2, bitmap4, and bitmap5 are created by invoking the original API of the operating system. Then, canvas2 is created based on bitmap2, canvas4 is created based on bitmap4, and canvas5 is created based on bitmap5. In canvas2, a preset character whose font size is 48px and character content is "This is a test text" is drawn by using a font file stream corresponding to the font 2, and a drawn result is saved in bitmap2. In canvas4, a preset character whose font size is 48px and character content is "This is a test text" is drawn by using a font file stream corresponding to the font 4, and a drawn result is saved in bitmap4. In canvas5, a preset character whose font size is 48px and character content is "This is a test text" is drawn by using a font file stream corresponding to the font 5, and a drawn result is saved in bitmap5. In this case, bitmap2 is a comparison dot matrix corresponding to the font 2, bitmap4 is a comparison dot matrix corresponding to the font 4, and bitmap5 is a comparison dot matrix corresponding to the font 5.

S45: Obtain the comparison dot matrix corresponding to the non-default font of the operating system.

Similarly, the comparison dot matrix corresponding to the non-default font of the operating system may be stored in a specific storage location, and the comparison dot matrix can be obtained by searching for a file in the location.

S14: Perform pixel matching on each comparison dot matrix and the target dot matrix, to determine a comparison dot matrix matching the target dot matrix, and use a font of a type corresponding to the matched comparison dot matrix as a target font.

During specific application, pixel comparison is performed on each obtained comparison dot matrix and the target dot matrix. When a comparison dot matrix whose pixel distribution is consistent with that of the target dot matrix is matched, the comparison dot matrix whose pixel distribution is consistent with that of the target dot matrix is used as the comparison dot matrix matching the target dot matrix, and a font corresponding to the comparison dot matrix is determined as the target font.

During specific application, both the target dot matrix and the comparison dot matrix may be monochromatic bitmaps. Whether pixel distribution of the target dot matrix is consistent with pixel distribution of the comparison dot matrix is determined by comparing values of pixels in the monochromatic bitmaps.

Herein, binary data of the target dot matrix and binary data of each comparison dot matrix may be separately obtained, to obtain, through matching, a comparison dot matrix whose binary data is completely consistent with the binary data of the target dot matrix. In this case, a font corresponding to the comparison dot matrix is a font corresponding to the target font.

Herein, a matching degree between the target dot matrix and each comparison dot matrix may also be calculated based on an existing bitmap matching degree algorithm, then the comparison dot matrix matching the target dot matrix is determined based on the matching degree between the target dot matrix and each comparison dot matrix, and a font corresponding to most matched comparison dot matrix is used as the target font. How to determine the comparison dot matrix matching the target dot matrix based on the matching degree between the target dot matrix and each comparison dot matrix may be setting a matching degree threshold. When the matching degree between the comparison dot matrix and the target dot matrix exceeds the matching degree threshold, it is determined that the comparison dot matrix is the comparison dot matrix corresponding to the target font. In this embodiment, the matching degree threshold may be 100%. This may be set based on an actual requirement, and is not limited herein. It should be noted that there are many bitmap matching degree algorithms, and the algorithms are relatively mature. This may be selected based on an actual requirement, and is not limited herein.

S15: Switch a font of the third-party application to the target font.

During specific application, switching the font used by the third-party application to the target font may be setting a storage path corresponding to a font file of the target font for the third-party application. Then, the third-party application can complete font switching during initialization of startup, so that the third-party application uses the target font, that is, uses a font consistent with the font currently used by the operating system. The storage path corresponding to the font file of the target font may be obtained by reading a file information record of the font file in the maps file by using the third-party application.

A font switching process is described by using an example in which the third-party application is a browser. When the browser is started, the browser performs initialization of a font library. In this case, the browser obtains the font file of the target font based on a font file path of the target font, loads the custom font file, displays a font corresponding to the font file of the target font by using the loaded custom font file, and renders a display interface of the browser by using a font family in the font file of the target font, so that a character used on the display interface of the browser is a character corresponding to the font file of the target font.

In conclusion, based on the font switching method provided in this embodiment of this application, a target font consistent with a font currently used by an operating system can be accurately determined by using a pixel comparison method, and then the target font is applied to a third-party application, so that a font used by the third-party application can be consistent with the font used by the operating system of an electronic device. This prevents a font used by third-party application software from being inconsistent with the font used by the operating system.

It may be understood that sequence numbers of the processes do not mean execution sequences in the foregoing embodiments. The execution sequences of the processes should be determined according to functions and internal logic of the processes, and should not be construed as any limitation on the implementation processes of embodiments of this application.

Based on a same inventive concept, in an implementation of the foregoing method, embodiments of this application provide an electronic device. The electronic device embodiment corresponds to the foregoing method embodiment. For ease of reading, details in the foregoing method embodiment are not described one by one in this embodiment. However, it should be clarified that the apparatus in this embodiment can correspondingly implement all content in the foregoing method embodiment.

Figure 15:
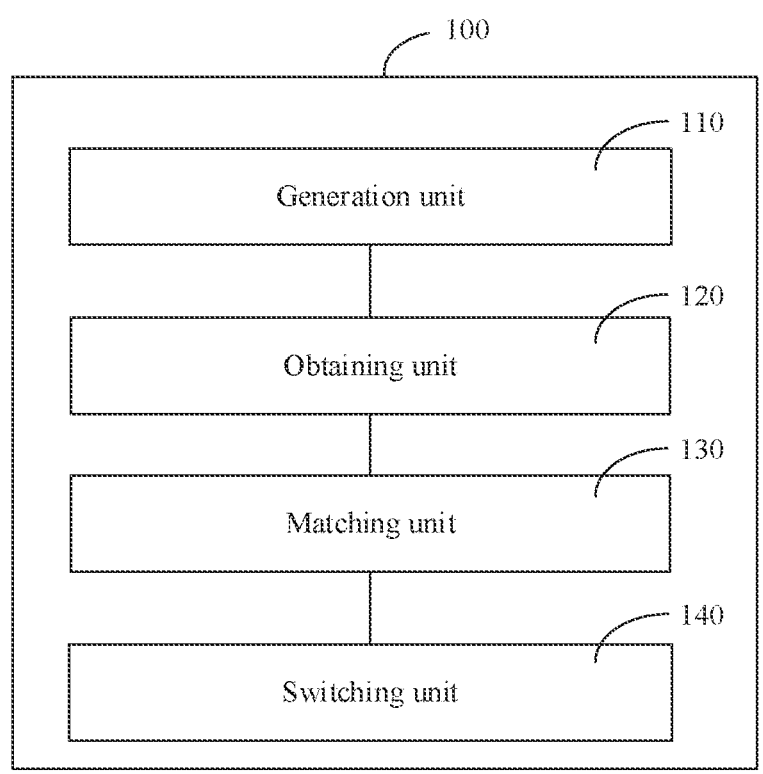
FIG. 15 is a schematic diagram of a structure of an electronic device according to an embodiment of this application.

FIG. 15 is a block diagram of a structure of an electronic device according to an embodiment of this application. Units included in an electronic device 100 are configured to perform the steps in the foregoing embodiments. For details, refer to related descriptions in the foregoing embodiments. For ease of description, only a part related to this embodiment of this application is shown. Refer to FIG. 13. The electronic device 100 includes a generation unit 110, an obtaining unit 120, a matching unit 130, and a switching unit 140.

The generation unit 110 is configured to generate a target dot matrix based on a font currently used by an operating system.

The obtaining unit 120 is configured to obtain comparison dot matrices corresponding to various types of fonts loaded by the operating system.

The matching unit 130 is configured to: perform pixel matching on each comparison dot matrix and the target dot matrix, to determine a comparison dot matrix matching the target dot matrix, and use a font corresponding to the matched comparison dot matrix as a target font.

The switching unit 140 is configured to switch a font of a third-party application to the target font.

In this embodiment of this application, the electronic device may further include a monitoring unit.

The monitoring unit is configured to: before the target dot matrix is generated based on the font currently used by the operating system, detect in real time whether the third-party application is started.

When the monitoring unit detects that the third-party application is started, a first generation unit performs a step of generating the target dot matrix.

In an embodiment, the generation unit 110 may include a first creating unit and a first drawing unit.

The first creating unit is configured to create a bitmap object and a canvas object.

The first drawing unit is configured to: draw a preset character in the canvas object based on the font currently used by the operating system, and save a drawn result in the bitmap object, to obtain the target dot matrix.

In an embodiment, the obtaining unit 120 is mainly configured to: obtain all types of fonts loaded by the operating system, generate comparison dot matrices corresponding to all types of fonts loaded by the operating system, and obtain the comparison dot matrices corresponding to all types of fonts loaded by the operating system.

Specifically, the obtaining unit 120 may include a second creating unit and a second drawing unit.

The second creating unit is configured to create canvas objects and bitmap objects corresponding to all types of fonts loaded by the operating system.

The second drawing unit is configured to: draw preset characters in the canvas objects based on font file streams corresponding to all types of fonts loaded by the operating system, and save drawn results in the bitmap objects corresponding to the various types of font.

In an embodiment, the obtaining unit 120 is mainly configured to: obtain all types of fonts loaded by the operating system and a default font of the operating system, determine a non-default font of the operating system based on all types of fonts loaded by the operating system and the default font of the operating system, generate a comparison dot matrix corresponding to the non-default font of the operating system, and obtain the comparison dot matrix corresponding to the non-default font of the operating system.

Specifically, the obtaining unit 120 may include a third creating unit and a third drawing unit.

The third creating unit is configured to create a canvas object and a bitmap object corresponding to each non-default font of the operating system.

The third drawing unit is configured to: draw a preset character in the canvas object based on a font file stream corresponding to each non-default font of the operating system, and save a drawn result in the bitmap object corresponding to each non-default font of the operating system.

In an embodiment, the matching unit 130 is mainly configured to: perform pixel comparison on each obtained comparison dot matrix and the target dot matrix, and when a comparison dot matrix whose pixel distribution is consistent with that of the target dot matrix is matched, use the comparison dot matrix whose pixel distribution is consistent with that of the target dot matrix as the comparison dot matrix matching the target dot matrix, and determine a font corresponding to the comparison dot matrix as the target font.

In an embodiment, both the target dot matrix and the comparison dot matrix are monochromatic bitmaps, and correspondingly, the matching unit is mainly configured to: separately obtain binary data of the target dot matrix and binary data of each comparison dot matrix, determine, as the comparison dot matrix matching the target dot matrix, a comparison dot matrix corresponding to the binary data of the comparison dot matrix that matches the binary data of the target dot matrix, and use the font of the type corresponding to the matched comparison dot matrix as the target font.

In an embodiment, the switching unit is mainly configured to: set a storage path of a font file of the target font for the third-party application, control the third-party application to obtain and load the font file of the target font based on the storage path of the font file of the target font, and render a display interface of the third-party application based on the loaded font file of the target font, so that a character used on the display interface of the third-party application is a character corresponding to the font file of the target font.

It can be learned from the foregoing that, the electronic device provided in this embodiment of this application can also create a target dot matrix based on a font currently used by an operating system, then find all fonts loaded in a process (that is, all fonts used by the operating system), perform pixel matching on comparison dot matrices corresponding to these fonts and the target dot matrix, find, from the comparison dot matrices, a comparison dot matrix most matching the target dot matrix, use a font corresponding to the comparison dot matrix as the target font, and then switch a font of a third-party application to the target font, so that the font used by the third-party application can be consistent with the font used by the operating system of the electronic device. This prevents the font used by the third-party application from being inconsistent with the font used by the operating system.

It should be noted that content such as information exchange between the foregoing apparatuses/units and the execution processes thereof is based on a same concept as the method embodiments of this application. For specific functions and technical effects of the content, method to the method embodiments. Details are not described herein again.

It may be clearly understood by a person skilled in the art that, for the purpose of convenient and brief description, division into the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

An embodiment of this application further provides a computer-readable storage medium. The computer-readable storage medium stores a computer program. When the computer program is executed by a processor, the steps in the foregoing font switching method may be implemented.

An embodiment of this application provides a computer program product. When the computer program product runs on a mobile terminal, the mobile terminal is enabled to implement the steps in the foregoing font switching method when executing the computer program product.

In addition, an embodiment of this application further provides an apparatus. The apparatus may be specifically a chip, a component or a module. The apparatus may include a processor and a memory connected to each other. The memory is configured to store computer-executable instructions. When the apparatus runs, the processor may execute the computer-executable instructions stored in the memory, so that the chip performs the font switching method in the foregoing method embodiments.

When the integrated unit is implemented in the form of a software function unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by a processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to a photographing apparatus/electronic device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

In the foregoing embodiments, descriptions of embodiments have respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatustnetwork device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
generating a target dot matrix based on a first font currently used by an operating system;
obtaining comparison dot matrices corresponding to various types of fonts loaded by the operating system;
performing pixel matching between each of the comparison dot matrices and the target dot matrix to determine a first comparison dot matrix matching the target dot matrix;
setting a second font of a type corresponding to the first comparison dot matrix as a target font; and
switching a third font of a third-party application to the target font.

2. The method of claim 1, further comprising:
creating a bitmap object and a canvas object;
drawing a preset character in the canvas object based on the first font, to obtain a drawn result; and
saving the drawn result in the bitmap object to obtain the target dot matrix.

3. The method of claim 1, further comprising:
performing pixel comparison between each of the comparison dot matrices and the target dot matrix;
identifying a second comparison dot matrix comprising a pixel distribution that is consistent with that of the target dot matrix;
setting, in response to identifying the second comparison dot matrix, the second comparison dot matrix as the first comparison dot matrix; and
determining a fourth font corresponding to the second comparison dot matrix as the target font.

4. The method of claim 1, wherein the target dot matrix and the first comparison dot matrix are monochromatic bitmaps, and wherein the method further comprises:
obtaining first binary data of the target dot matrix and second binary data of each of the comparison dot matrices; and
setting a second comparison dot matrix comprising the second binary data that matches the first binary data as the first comparison dot matrix.

5. The method of claim 1, further comprising:
obtaining the various types of fonts;
creating canvas objects and bitmap objects corresponding to the various types of fonts;
drawing preset characters in the canvas objects based on the various types of fonts, to obtain drawn results; and
saving the drawn results in the bitmap objects.

6. The method of claim 1, further comprising:
obtaining all types of fonts loaded by the operating system and a default font of the operating system;
determining a non-default font of the operating system based on all types of fonts and the default font;
generating a second comparison dot matrix corresponding to the non-default font; and
obtaining the second comparison dot matrix.

7. The method of claim 6, further comprising:
creating a canvas object and a bitmap object corresponding to each non-default font of the operating system;
drawing a preset character in the canvas object based on each non-default font, to obtain a drawn result; and
saving the drawn result in the bitmap object.

8. The method of claim 1, wherein before generating the target dot matrix, the method further comprises detecting whether the third-party application is started.

9. The method of claim 1, further comprising selecting, by a user, a custom font as the first font.

10. The method of claim 1, further comprising:
setting a storage path of a font file of the target font for the third-party application;
controlling the third-party application to obtain and load the font file based on the storage path; and
rendering a display interface of the third-party application based on the font file, wherein a character used on the display interface is a character corresponding to the font file.

11. An electronic device comprising:
a memory configured to store instructions; and
a processor coupled to the memory and configured to execute the instructions to cause the electronic device to:
generate a target dot matrix based on a first font currently used by an operating system;
obtain comparison dot matrices corresponding to various types of fonts loaded by the operating system;
perform pixel matching between each of the comparison dot matrices and the target dot matrix to determine a first comparison dot matrix matching the target dot matrix;
set a second font of a type corresponding to the first comparison dot matrix as a target font; and
switch a third font of a third-party application to the target font.

12. The electronic device of claim 11, wherein the processor is further configured to execute the instructions to cause the electronic device to:
create a bitmap object and a canvas object;
draw a preset character in the canvas object based on the first font to obtain a drawn result; and
save the drawn result in the bitmap object to obtain the target dot matrix.

13. The electronic device of claim 11, wherein the processor is further configured to execute the instructions to cause the electronic device to:
perform pixel comparison between each of the comparison dot matrices and the target dot matrix;
identify a second comparison dot matrix comprising a pixel distribution that is consistent with that of the target dot matrix;
set, in response to identifying the second comparison dot matrix, the second comparison dot matrix as the first comparison dot matrix; and
determine a fourth font corresponding to the second comparison dot matrix as the target font.

14. The electronic device of claim 11, wherein the target dot matrix and the first comparison dot matrix are monochromatic bitmaps, and wherein the processor is further configured to execute the instructions to cause the electronic device to:
obtain first binary data of the target dot matrix and second binary data of each of the comparison dot matrices; and
set a second comparison dot matrix comprising the second binary data that matches the first binary data as the first comparison dot matrix.

15. The electronic device of claim 11, wherein the processor is further configured to execute the instructions to cause the electronic device to:
obtain the various types of fonts;
create canvas objects and bitmap objects corresponding to the various types of fonts;
draw preset characters in the canvas objects based on the various types of fonts to obtain drawn results; and
save the drawn results in the bitmap objects.

16. The electronic device according to of claim 11, wherein the processor is further configured to execute the instructions to cause the electronic device to:
obtain all types of fonts loaded by the operating system and a default font of the operating system;
determine a non-default font of the operating system based on all types of fonts and the default font;
generate a second comparison dot matrix corresponding to the non-default font; and
obtain the second comparison dot matrix.

17. The electronic device of claim 11, wherein the processor is further configured to execute the instructions to cause the electronic device to:
create a canvas object and a bitmap object corresponding to each non-default font of the operating system;
draw a preset character in the canvas object based on each non-default font to obtain a drawn result; and
save the drawn result in the bitmap object.

18. A computer program product comprising computer-executable instructions that are stored on a non-transitory computer-readable storage medium and that, when executed by a processor, cause an electronic device to:
generate a target dot matrix based on a first font currently used by an operating system;
obtain comparison dot matrices corresponding to various types of fonts loaded by the operating system;
perform pixel matching between each of the comparison dot matrices and the target dot matrix to determine a first comparison dot matrix matching the target dot matrix;
set a second font of a type corresponding to the first comparison dot matrix as a target font; and
switch a third font of a third-party application to the target font.

19. The computer program product of claim 18, wherein the computer-executable instructions further cause the electronic device to:
create a bitmap object and a canvas object;
draw a preset character in the canvas object based on the first font to obtain a drawn result; and
save the drawn result in the bitmap object to obtain the target dot matrix.

20. The computer program product of claim 18, wherein the computer-executable instructions further cause the electronic device to:
perform pixel comparison between each of the comparison dot matrices and the target dot matrix;
identify a second comparison dot matrix comprising a pixel distribution that is consistent with that of the target dot matrix;
set, in response to identifying the second comparison dot matrix, the second comparison dot matrix as the first comparison dot matrix; and determine a fourth font corresponding to the first comparison dot matrix as the target font.

* * * * *